US012608173B1

(12) United States Patent
Espenhahn et al.

(10) Patent No.: US 12,608,173 B1
(45) Date of Patent: Apr. 21, 2026

(54) DOCUMENT SORTING WITH BITMAP INDEXES

(71) Applicant: Amazon Technologies, Inc., Seattle, WA (US)

(72) Inventors: John Espenhahn, San Francisco, CA (US); Ali Koc, Smithtown, NY (US); Nitya Dhimantkumar Sheth, Belmont, CA (US); Rajat Mathur, Sunnyvale, CA (US); Vidit Ochani, Bothell, WA (US); Ronald Stephen Kyker, Hayward, CA (US); Amit Gul Phagwani, Fremont, CA (US); George Steven McPherson, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 18/541,822

(22) Filed: Dec. 15, 2023

(51) Int. Cl.
*G06F 7/08* (2006.01)
*G06F 16/22* (2019.01)

(52) U.S. Cl.
CPC ............ *G06F 7/08* (2013.01); *G06F 16/2237* (2019.01)

(58) Field of Classification Search
CPC ........ G06F 16/2237; G06F 16/22; G06F 7/08; G06F 7/14; G06F 7/16
USPC ....................................................... 707/753
See application file for complete search history.

(56) References Cited

U.S. PATENT DOCUMENTS

| | | | | |
|---|---|---|---|---|
| 5,377,814 A | * | 1/1995 | Smith | ........................ G06F 7/08 |
| | | | | 198/465.4 |
| 5,594,898 A | * | 1/1997 | Dalal | .................. G06F 16/2456 |
| | | | | 707/696 |
| 5,692,176 A | * | 11/1997 | Holt | ...................... G06F 16/319 |
| | | | | 707/999.005 |
| 10,522,386 B2 | * | 12/2019 | Shinohara | ............. C23C 16/042 |
| 2007/0016637 A1 | * | 1/2007 | Brawn | ................ H04L 47/2441 |
| | | | | 709/200 |
| 2008/0071781 A1 | * | 3/2008 | Ninan | ............... G06F 16/90344 |

(Continued)

FOREIGN PATENT DOCUMENTS

EP    3435256 A2 *   1/2019

OTHER PUBLICATIONS

Shankar, V., "An Algorithm to Evaluate Iceberg Query using Compacted Bitmap Vector", International Journal of Computer Applications, vol. 60, No. 15, Dec. 2012 Year: 2012 (Year: 2012).*

*Primary Examiner* — Shahid A Alam

(74) *Attorney, Agent, or Firm* — Nicholson DeVos Webster & Elliott LLP

(57) ABSTRACT

Techniques for document sorting with bitmap indexes are described. A request to sort a set of documents is received. A bitmap that identifies the set of documents to be sorted is obtained. An ordered set of sort bitmaps is obtained, each sort bitmap in the ordered set of sort bitmaps corresponding to a bit in an encoding of a data type to be sorted. A series of passes of bitwise operations is performed with the ordered set of sort bitmaps, each pass to identify a next document identifier to add to a sorted set of document identifiers by processing an initial bitmap with bitwise operations in order against at least a portion of the ordered set of sort bitmaps. The initial bitmap of the first pass in the series of passes is initialized with the obtained bitmap. The sorted set of document identifiers is stored.

20 Claims, 11 Drawing Sheets

(56)              References Cited

U.S. PATENT DOCUMENTS

| | | | |
|---|---|---|---|
| 2012/0303633 A1* | 11/2012 | He ...................... | G06F 16/2453 |
| | | | 707/E17.051 |
| 2016/0034587 A1* | 2/2016 | Barber .............. | G06F 16/24532 |
| | | | 707/754 |
| 2018/0121504 A1* | 5/2018 | Bienert ............. | G06F 16/24537 |
| 2019/0197125 A1* | 6/2019 | Ma ........................ | G06F 16/438 |

\* cited by examiner

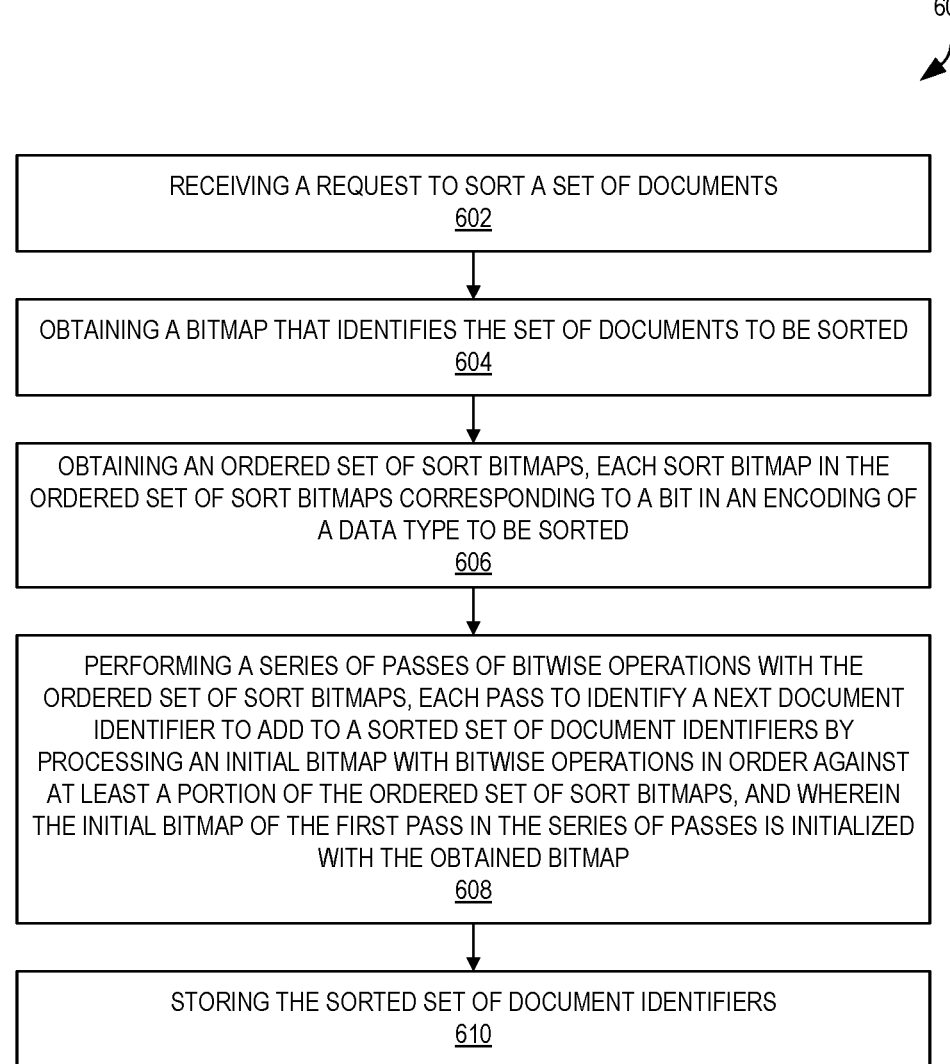

OPERATIONS
600

RECEIVING A REQUEST TO SORT A SET OF DOCUMENTS
602

OBTAINING A BITMAP THAT IDENTIFIES THE SET OF DOCUMENTS TO BE SORTED
604

OBTAINING AN ORDERED SET OF SORT BITMAPS, EACH SORT BITMAP IN THE
ORDERED SET OF SORT BITMAPS CORRESPONDING TO A BIT IN AN ENCODING OF
A DATA TYPE TO BE SORTED
606

PERFORMING A SERIES OF PASSES OF BITWISE OPERATIONS WITH THE
ORDERED SET OF SORT BITMAPS, EACH PASS TO IDENTIFY A NEXT DOCUMENT
IDENTIFIER TO ADD TO A SORTED SET OF DOCUMENT IDENTIFIERS BY
PROCESSING AN INITIAL BITMAP WITH BITWISE OPERATIONS IN ORDER AGAINST
AT LEAST A PORTION OF THE ORDERED SET OF SORT BITMAPS, AND WHEREIN
THE INITIAL BITMAP OF THE FIRST PASS IN THE SERIES OF PASSES IS INITIALIZED
WITH THE OBTAINED BITMAP
608

STORING THE SORTED SET OF DOCUMENT IDENTIFIERS
610

*FIG. 6*

OPERATIONS
800

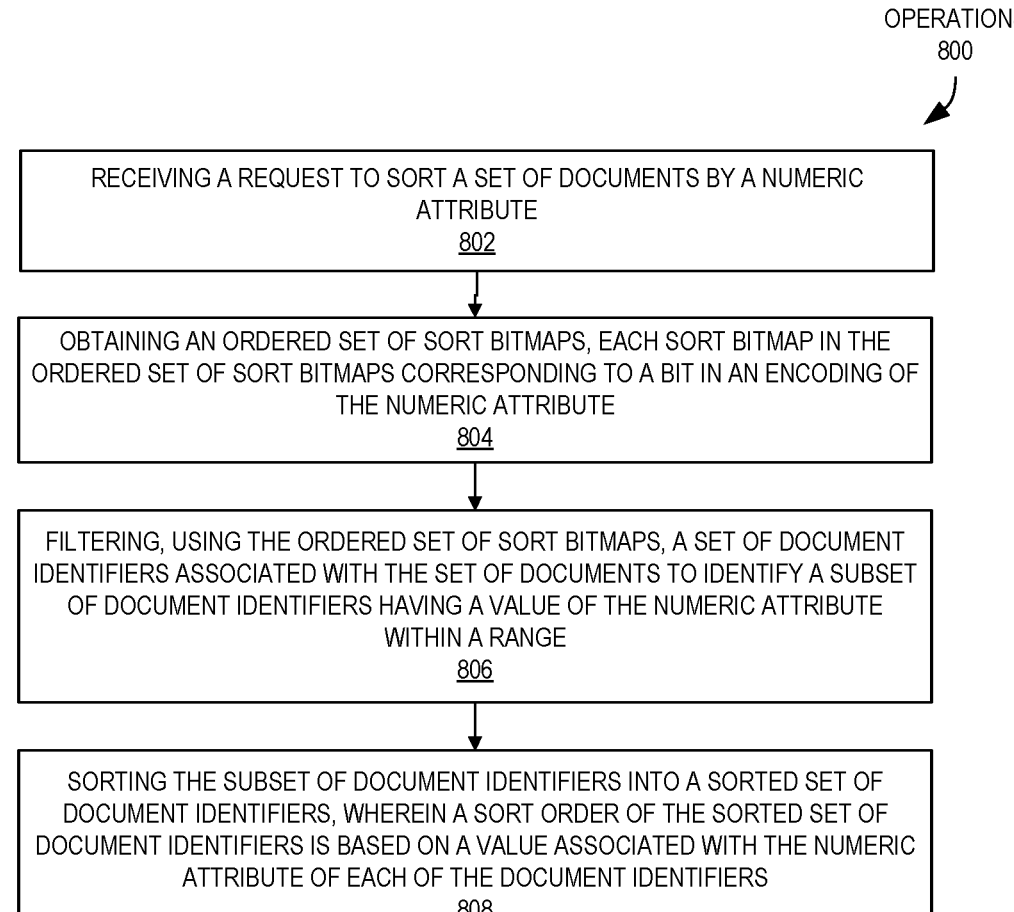

RECEIVING A REQUEST TO SORT A SET OF DOCUMENTS BY A NUMERIC
ATTRIBUTE
802

OBTAINING AN ORDERED SET OF SORT BITMAPS, EACH SORT BITMAP IN THE
ORDERED SET OF SORT BITMAPS CORRESPONDING TO A BIT IN AN ENCODING OF
THE NUMERIC ATTRIBUTE
804

FILTERING, USING THE ORDERED SET OF SORT BITMAPS, A SET OF DOCUMENT
IDENTIFIERS ASSOCIATED WITH THE SET OF DOCUMENTS TO IDENTIFY A SUBSET
OF DOCUMENT IDENTIFIERS HAVING A VALUE OF THE NUMERIC ATTRIBUTE
WITHIN A RANGE
806

SORTING THE SUBSET OF DOCUMENT IDENTIFIERS INTO A SORTED SET OF
DOCUMENT IDENTIFIERS, WHEREIN A SORT ORDER OF THE SORTED SET OF
DOCUMENT IDENTIFIERS IS BASED ON A VALUE ASSOCIATED WITH THE NUMERIC
ATTRIBUTE OF EACH OF THE DOCUMENT IDENTIFIERS
808

*FIG. 8*

DOCUMENT SORTING WITH BITMAP INDEXES

BACKGROUND

The data footprint of businesses and other entities continues to grow, particularly in cloud-based computing environments where the storage capacity can appear unlimited. Data can be represented in documents, which can take on a variety of forms and originate from a variety of sources. Search and sorting algorithms provide the ability to identify relevant documents quickly and accurately.

BRIEF DESCRIPTION OF DRAWINGS

Various examples in accordance with the present disclosure will be described with reference to the drawings, in which:

FIG. 6 is a flow diagram illustrating operations of a method for bitmap-based document sorting according to some examples.

FIG. 8 is a flow diagram illustrating operations of another method for bitmap-based document sorting according to some examples.

DETAILED DESCRIPTION

The present disclosure relates to methods, apparatus, systems, and non-transitory computer-readable storage media for bitmap-based document sorting. According to some examples, an indexer function generates bitmaps from data in a set of documents, and a sort function sorts the documents using the bitmaps. Bitmaps index sortable data in documents. A single bitmap can contain the binary value of a particular bit in an encoding of a sortable attribute (e.g., title, author, body, date created, last modified date, etc.) of each of the documents in a document set. For example, with numeric data types, bitmaps correspond to a bit-position within the binary encoding of the number: one bitmap can be the least significant bit (e.g., bit 0) of a sortable attribute of the documents, another bitmap can be the next least significant bit (e.g., bit 1) for the sortable attribute of the documents, and so on. With strings of characters, bitmaps can be indexed based on their character position and bit position within the binary encoding of the character (e.g., UTF-8, ASCII, etc.): bitmaps for the bits of the encoding of the $0^{th}$ character position, bitmaps for the bits of the encoding of the $1^{st}$ character position, and so on. By using the indexer-generated bitmaps, the sort function can perform content-based document sorting with bitwise operations (e.g., AND, OR, NOT, XOR, etc.)—typically without accessing the underlying documents. Given processors are very efficient at such operations, the sorting techniques detailed herein can provide very high performance relative to other sorting approaches.

In some examples, the indexer and sort functions can be integrated as part of a sort service of a cloud provider network that provides other services (e.g., search services, document management services, etc.) or customers with document sorting functionality sorting. The sort function can be invoked on a smaller subset of the documents that have been indexed, such as a set of documents that are returned from a search.

In some examples, the indexer and sort functions are applications that can be executed with computing resources provided by other services of the cloud provider network such as an on-demand code execution service and a database service, for example. Using the on-demand code execution service, for example, the indexer and sort functions can be executed to service concurrent requests from multiple sources. When a request has been serviced, the underlying resources used to execute the search or indexer function can be freed for other uses. As a result, the cost of sorting is reduced as compared to other solutions that may require a persistent resource allocation or be limited to single-tenant applications.

Figure 1:
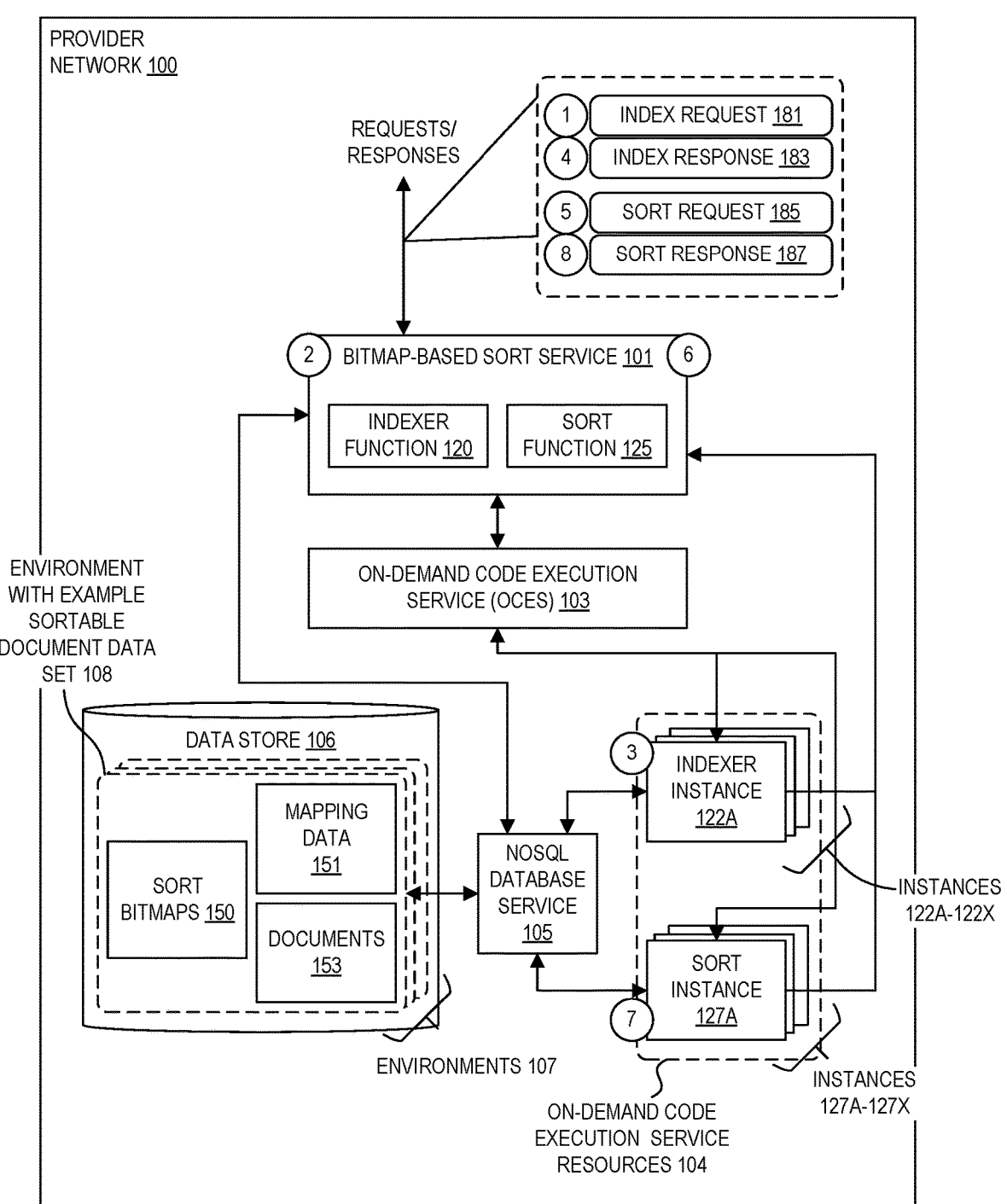
FIG. 1 is a diagram illustrating a cloud provider network environment including document services providing bitmap-based document sorting according to some examples.

FIG. 1 is a diagram illustrating a cloud provider network environment including a bitmap-based sort service ("BSS") 101 providing bitmap-based document sorting according to some examples. A provider network 100 (or, "cloud" provider network) provides users with the ability to use one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources can be provided as services, such as a hardware virtualization service that can execute compute instances, a storage service that can store data objects, etc. The users (or "customers") of provider networks 100 can use one or more user accounts that are associated with a customer account, though these terms can be used somewhat interchangeably depending upon the context of use. Users can interact with a provider network 100 across one or more intermediate networks (e.g., the internet) via one or more interface(s), such as through use of application programming interface (API) calls, via a console implemented as a website or application, etc. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) can be part of, or serve as a front-end to, a control plane of the provider network 100 that includes "backend" services supporting and enabling the services that can be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

To provide these and other computing resource services, provider networks 100 often rely upon virtualization techniques. For example, virtualization technologies can provide users the ability to control or use compute resources (e.g., a "compute instance," such as a VM using a guest operating system (O/S) that operates using a hypervisor that might or might not further operate on top of an underlying host O/S, a container that might or might not operate in a VM, a compute instance that can execute on "bare metal" hardware without an underlying hypervisor), where one or multiple compute resources can be implemented using a single electronic device. Thus, a user can directly use a compute resource (e.g., provided by a hardware virtualization service) hosted by the provider network to perform a variety of computing tasks. Additionally, or alternatively, a user can indirectly use a compute resource by submitting code to be executed by the provider network (e.g., via an on-demand code execution service), which in turn uses one or more compute resources to execute the code—typically without the user having any control of or knowledge of the underlying compute instance(s) involved.

As described herein, one type of service that a provider network may provide may be referred to as a "managed compute service" that executes code or provides computing resources for its users in a managed configuration. Examples of managed compute services include, for example, a hardware virtualization service, a container service, an on-demand code execution service, or the like.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which can run at least on an offload card of the server (e.g., a card connected via PCI or PCIe to the physical CPUs) and other components of the virtualization host can be used for some virtualization management components. Such an offload card of the host can include one or more CPUs that are not available to user instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

In some examples, the execution of compute instances is supported by a lightweight virtual machine manager (VMM). These VMMs enable the launch of lightweight micro-virtual machines (micro VMs) in non-virtualized environments in fractions of a second. These VMMs can also enable container runtimes and container orchestrators to manage containers as microVMs. These microVMs nevertheless take advantage of the security and workload isolation provided by traditional VMs and the resource efficiency that comes along with containers, for example by being run as isolated processes by the VMM. A microVM, as used herein, refers to a VM initialized with a limited device model and/or with a minimal OS kernel that is supported by the lightweight VMM, and which can have a low memory overhead of <5 MiB per microVM such that thousands of microVMs can be packed onto a single host. For example, a microVM can have a stripped down version of an OS kernel (e.g., having only the required OS components and their dependencies) to minimize boot time and memory footprint. In one implementation, each process of the lightweight VMM encapsulates one and only one microVM. The process can run the following threads: API, VMM and vCPU(s). The API thread is responsible for the API server and associated control plane. The VMM thread exposes a machine model, minimal legacy device model, microVM metadata service (MMDS), and VirtIO device emulated network and block devices. In addition, there are one or more vCPU threads (one per guest CPU core).

Another type of managed compute service can be a container service, such as a container orchestration and management service (referred to in various implementations as a container service, cloud container service, container engine, or container cloud service) that allows users of the cloud provider network to instantiate and manage containers. In some examples the container service can be a Kubernetes-based container orchestration and management service (referred to in various implementations as a container service for Kubernetes, Azure Kubernetes service, IBM cloud Kubernetes service, Kubernetes engine, or container engine for Kubernetes). A container, as referred to herein, packages up code and all its dependencies so an application (also referred to as a task, pod, or cluster in various container services) can run quickly and reliably from one computing environment to another. A container image is a standalone, executable package of software that includes everything needed to run an application process: code, runtime, system tools, system libraries and settings. Container images become containers at runtime. Containers are thus an abstraction of the application layer (meaning that each container simulates a different software application process). Though each container runs isolated processes, multiple containers can share a common operating system, for example by being launched within the same virtual machine. In contrast, virtual machines are an abstraction of the hardware layer (meaning that each virtual machine simulates a physical machine that can run software). While multiple virtual machines can run on one physical machine, each virtual machine typically has its own copy of an operating system, as well as the applications and their related files, libraries, and dependencies. Some containers can be run on instances that are running a container agent, and some containers can be run on bare-metal servers, or on an offload card of a server.

An on-demand code execution service (OCES) 103 (referred to in various examples as a function compute service, functions service, cloud functions service, functions as a service, or serverless computing service) can enable users of the provider network 100 to execute their code on cloud resources without having to select or manage the underlying hardware resources used to execute the code. For example, a user can use an on-demand code execution service 103 by uploading their code and use one or more APIs to request that the OCES 103 identify, provision, and manage any resources required to run the code. Thus, in various examples, a "serverless" function can include code provided by a user or other entity-such as the provider network itself—that can be executed on demand. Serverless functions can be maintained within the provider network by an OCES 103 and can be associated with a particular user or account or can be generally accessible to multiple users/ accounts. A serverless function can be associated with a Uniform Resource Locator (URL), Uniform Resource Identifier (URI), or other reference, which can be used to invoke the serverless function. A serverless function can be executed by a compute resource, such as a virtual machine, container, etc., when triggered or invoked. In some examples, a serverless function can be invoked through an application programming interface (API) call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some examples, these resources can be maintained in a "ready" state (e.g., having a pre-initialized runtime environment configured to execute the serverless functions), allowing the serverless functions to be executed in near-real-time.

In the illustrated example, the BSS 101 provides for the indexing documents for sorting with bitmaps and the sorting of indexed documents with those bitmaps. The BSS 101 can vend an API via which a caller (sometimes referred to as a "requestor" or "originator") can issue requests to the BSS 101 to perform various operations related to the indexing and sort of documents. An exemplary deployment of the BSS 101 would be as a sort backend for other services or applications (e.g., a search service, a document management service, etc.). One such other service is a business data cataloging service that allows cloud customers to annotate their data to discover, share, and track data across their organization. Such a service can be populated from a variety of data sources such as database tables, spreadsheets, dashboards, streaming solutions, data pipelines, IoT devices, ML models, images, videos and more. The other service or application would compose document indexing and sort requests and submit them to the BSS 101.

Documents can be composed of attributes (sometimes referred to as "annotated documents"). Such documents are typically represented using a structured file format. One such file format is JavaScript Object Notation (JSON). Documents might originate from the Internet (e.g., websites with URLs, author information, etc.), from cloud-based applications or services (e.g., a customer support application that generates documents including attributes such as customer identifier, product identifier, date, complaint, etc.), or from various other applications of an individual or business (e.g., in word processing application with metadata indicating the author, date edited, company, version, etc.).

In some examples, environments 107 represent a collection of the set of data and/or metadata of a given set of documents that have been indexed for sorting. Different environments provide support for different customers and for individual customers to index different sets of documents. An environment 107 with an example sortable document data set 108 is illustrated. The sortable document data set 108 includes sort bitmaps 150, mapping data 151, and can even include the underlying indexed documents 153. In some examples, an environment can be implemented as a database, and the sort bitmaps 150, mapping data 151, and documents 153 can be tables in the database (e.g., as key-value tables in NoSQL, relational tables in SQL type databases, etc.). Additional details on bitmaps, mapping data 151, and documents 153 are illustrated and described with reference to FIG. 2.

The compute and storage infrastructure of the provider network 100 supporting the BSS 101 can take on a variety of forms. In the illustrated example, the compute backing (e.g., for performing indexing and sort operations, sometimes referred to as a "capacity") is provided by the OCES 103 and a data store 106 providing the storage backing is provided by a NoSQL database service 105 that provides virtualized databases. The NoSQL database service 105 can vend an API through which other entities (e.g., an indexer instance or a sort instance) can store and retrieve data from a database. An exemplary NoSQL database is a key-value database where values are stored under unique key names. Other compute backings are viable and include virtual machines launched via the hardware virtualization service and containers launched via the container service. Other storage backings are viable and include object stores, SQL databases, block-based storage, etc.

In examples leveraging the OCES 103 as compute capacity, the BSS 101 launches function "instances" via the OCES 103. Such instances execute on OCES resources 104 using containers, virtual machines, etc. More generally, the BSS 101 can cause the launch of the function instances by submitting launch requests to the managed compute service providing the compute backing for the BSS 101. Exemplary functions are the indexer function 120 and the sort function 125. The functions 120, 125 are authored in a language executable within a function instance environment. Exemplary languages include Java, Go, PowerShell, Node.js, C#, Python, and Ruby code. The functions are typically generic—the same indexer function 120 can be launched on many different indexer instances 122A-X via the OCES 103 to perform indexer operations to service different indexing requests; the same sort function 125 can be launched on many different sort instances 127A-Y via the OCES 103 to perform sorting operations to service different sorting requests. Environment variables (not to be confused with data set environments) included or identified as part of a launch request to execute a function can be used to change the behavior of a function. Environment variables may also be referred to as external or configuration variables. The function can be programmed to access these environment variables at runtime. Such variables typically relay the various request parameters received with an index request or a sort request to the launched instance as described below.

In some examples, the OCES 103 and launched instances 122, 127 can be considered part of the BSS 101.

In some examples, the BSS 101 supports concurrent requests from callers (i.e., requests are non-blocking). Upon receiving an indexing request or sort request, the BSS 101 can initiate the launch of an instance to execute the corresponding function. The instance executes while the BSS 101 launches other instances to service other requests and responds to other outstanding requests. As a result, such examples can support concurrent sort and indexing operations for multiple environments and/or multiple customers.

When the BSS 101 launches an instance via the OCES 103, it can assign (e.g., as a configuration variable) or receive an identifier of the instance from the OCES 103 that identifies the instance. The BSS 101 can associate that instance identifier with a request identifier in request tracking data (not shown). In some examples, the tracking data can store, for a received request, an assigned request identifier, any parameters included with the request, and an identification of the caller. When the function completes, the function can return a response to the BSS 101, the response including the instance identifier. Using the instance identifier and the request tracking data, the BSS 101 can identify the original request and issue a response to the caller.

In some examples, the BSS 101 can vend an API through which callers can create or delete environments. Environments can be identified with an environment identifier. The environment identifier can correspond to or be otherwise associated with a database identifier in cases where each environment is implemented using a database of a database service. For example, upon receiving a request to create an environment, the BSS 101 can create an environment in the data store 106 and return an associated environment identifier to the caller by, for example, creating a database with the NoSQL database service 105. Upon receiving a request to delete an environment associated with an environment identifier, the BSS 101 can delete the environment associated with the provided environment identifier from the data store 106.

The indexer function 120 generates sort bitmaps from documents. An exemplary document indexing flow is described with reference to circles 1-4. At circle 1, the BSS 101 receives an indexing request 181, the request 181 including one or more parameters. One exemplary parameter is an identification of the environment in which to index documents. Another exemplary parameter is the documents to be indexed and/or location(s) of documents to be indexed (e.g., if stored in another data store of the provider network 100). Another exemplary parameter is the document identifier attribute (e.g., if pre-assigned). Another exemplary parameter is an identification of the document attribute(s) to be indexed for sorting, optionally including an indication of the per-attribute data encoding.

At circle 2, the BSS 101 processes the indexing request 181. Processing the request can include preparing the environment variables for an indexer function 120 based on the parameters included in the indexing request 181. Such variables can include the environment into which to index documents, the documents to index or a location of the documents, an indication of the document identifier attribute (if specified), an instance identifier, etc. With the OCES 103 as a compute backing, the BSS 101 requests the launch of a serverless instance to execute the indexer function 120 (referred to here as an "indexer instance"), the launch request including the indexer function 120 or a location thereof and the environment variables or a location thereof. The BSS 101 also updates request tracking data to associate an identifier of the instance with an identifier of the request received at circle 1. The BSS 101 may assign and pass along an instance identifier as an environment variable or receive an instance identifier from the OCES 103 in response to the launch request.

At circle 3, the launched indexer instance 122A executes the indexer function 120 as configured by the environment variables. The indexer instance 122A generates and stores data in the sortable document data set 108 in the specified environment 107 in the data store 106. The indexer instance 122A generates and stores bitmaps 150 and mapping data 151. The indexer instance 122A can also store indexed documents as values in a table indexed by document identifier. In some examples the documents are stored in compressed form. Additional details of the various operations that can be performed by the indexer function 120 are provided with reference to FIG. 2.

Once the indexer instance 122A completes execution of the indexing operations, the indexer instance 122A can send a response to the BSS 101, the response including an identifier that the BSS 101 can use to identify the associated inbound request that the indexer instance 122A was servicing within the request tracking data. Based on that identification, the ISS can send an indexing response 183 to the caller that issued the request 181 to indicate that the requested indexing operations are complete as indicated at circle 4. Once indexing operations are complete, the BSS 101 can request the termination of the indexer instance 122A with the OCES 103. In other examples, the indexer instance 122A can self-terminate after sending the response to the BSS 101.

The sort function 125 performs operations with bitmaps to sort indexed documents. An exemplary sort flow is described with reference to circles 5-8. At circle 5, the BSS 101 receives a sort request 185, the request 185 including one or more parameters. One exemplary parameter is an identification of the environment that includes the documents to sort. Another exemplary parameter is an identification of a subset of the documents within the set of indexed to sort. Such an identification can be used in cases where the requestor has identified a limited set of documents of interest (e.g., the result of a search query). If the subset of documents are a product of a bitmap-based query that includes a shared mapping between documents and bit positions within a bitmap for search and sort, the identification of the set of documents can be specified as a bitmap.

At circle 6, the BSS 101 processes the request. Processing the request 185 can include preparing the environment variables for a sort function 125 based on the parameters included in the request 185 such as the environment including the data to be sorted, the subset of documents to sort (if specified), an instance identifier, etc. With the OCES 103 as a compute backing, the BSS 101 requests the launch of a serverless instance to execute the sort function 125 (referred to here as an "search instance"), the launch request including the sort function 125 or a location thereof and the environment variables or a location thereof. The BSS 101 also updates request tracking data to associate an identifier of the instance with an identifier of the request received at circle 5. Again, BSS 101 may assign and pass along an identifier as an environment variable or receive an identifier from the OCES 103 in response to the launch request.

At circle 7, the launched sort instance 127A executes the sort function 125 as configured by the environment variables. The sort instance 127A evaluates the request by performing a series of bitwise operations across the bitmaps. Typically, the sort instance executes the query without accessing the documents 153. The sort instance 127A generates the sort result. The result can include or identify the documents 153 in sorted order. Additional details of the various operations that can be provided by the sort function 125 and various example sort operations are illustrated and described with reference to FIGS. 3-5 and 7.

Once the sort instance 127A completes execution of the sort operations and has generated the sort result, the sort instance 127A can send a response to the BSS 101, the response including the sort result and an identifier that the BSS 101 can use to identify the associated inbound request that the sort instance 127A was servicing within the request tracking data. Based on that identification, the ISS can send the sort response 187 to the caller that issued the request 181 to provide the sort results as indicated at circle 8. Once sort operations are complete, the BSS 101 can request the termination of the sort instance 127A with the OCES 103. In other examples, the sort instance 127A can self-terminate after sending the response to the BSS 101.

In some examples, the sort result can be provided in pages. For example, if 1,000 documents have been indexed for sorting, the sort instance can return the N documents in sorted order (whether ascending or descending) where N is the page size (e.g., 25 documents). In some examples that support paging, a given sort instance 127 may be terminated after providing a page of results. To preserve the page location, the sort result can include an identification of the last document in the sort. The BSS 101 can store the identification of the last document in the tracking data. Later, when a request for the next page arrives, the BSS 101 can launch another sort instance 127 with an environment variable specifying the last identified document, and that sort instance 127 can identify the next N sorted documents. In other examples that support paging, the sort instance 127 can persist after generating a results page. In such cases, the BSS 101 can receive inbound next page requests and send those requests to the pending sort instance 127 for processing to identify the next sorted page of results.

In some examples, the BSS 101 can buffer paged sort results and return previously viewed sort pages without additional sort operations performed by a sort instance 127. For example, if the caller pages through sorted page 5 and later requests page 5, the BSS 101 can respond with the buffered results.

Figure 2:
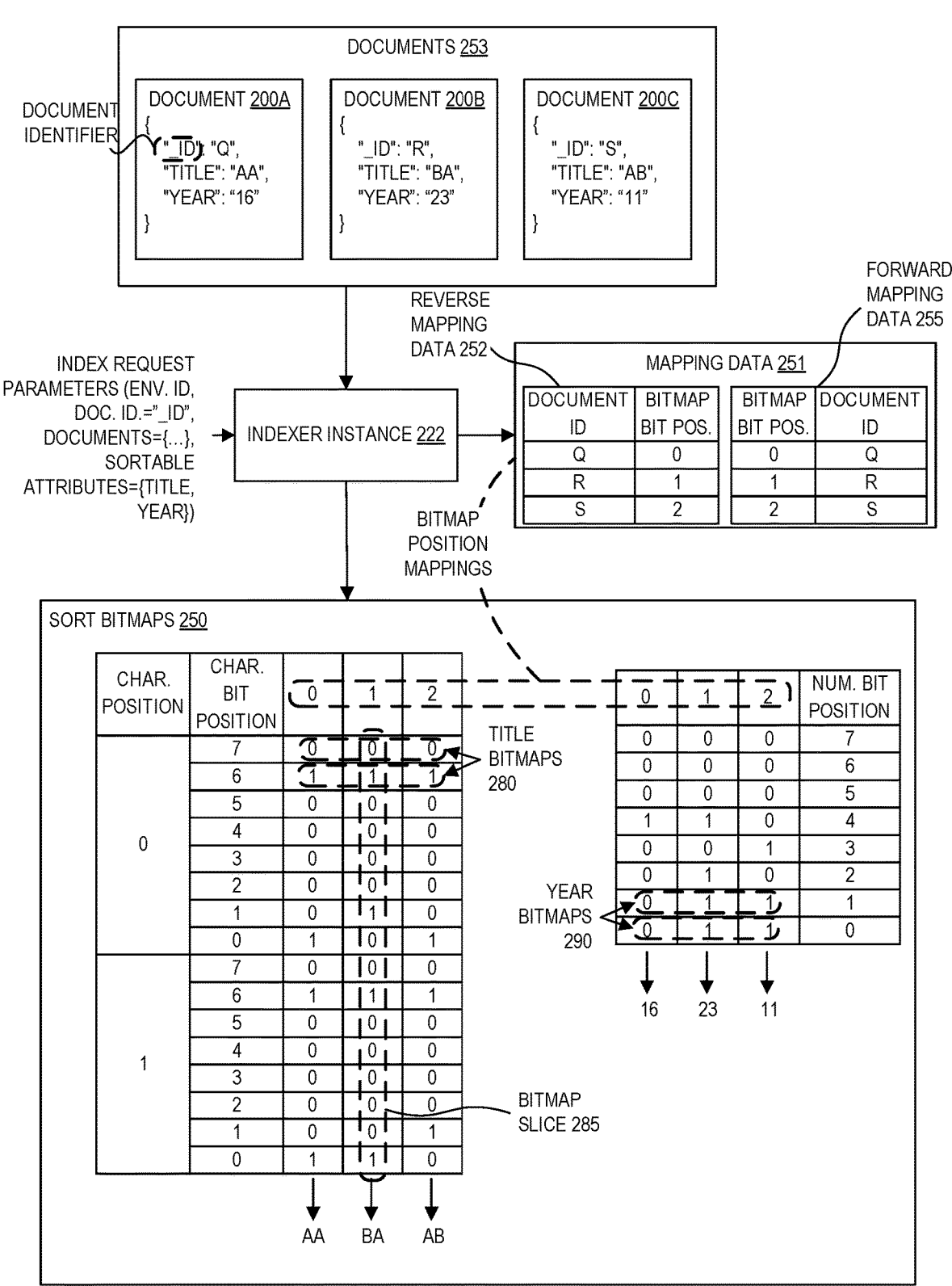
FIG. 2 is a diagram illustrating sort bitmap indexing according to some examples.

FIG. 2 is a diagram illustrating sort bitmap indexing according to some examples. Bitmaps index sortable data in documents. The indexer function generates a set of sort bitmaps for each sortable attribute within a given sortable document set. A single bitmap can contain the binary values of a particular bit position across the encodings of the sortable document attribute (e.g., title, author, body, date created, last modified date, etc.) of each of the documents in a document set. Each bit position within a bitmap corresponds to a document (e.g., document identifier) in the sortable document set. The values in the bitmaps are based on the binary encoding of the document attribute values. For example, a character encoding such as UTF-8 or ASCII can be used to represent characters, per-character character encodings can be used to represent strings, signed or unsigned binary values can be used to represent numeric data, etc.

In an example using the OCES 103, an indexer function is executed by an indexer instance 222 to generate or update mapping data and/or sort bitmaps. The indexer instance receives index request parameters, such as in environment variables provided by the BSS 101 as part of the indexer instance 222 launch. Exemplary parameters include an environment identifier, an indication of the attribute to be used as the document identifier, an identification of the documents (e.g., as the documents themselves or an indication of the location of the documents in some data store), and the document attributes to index for sorting with bitmaps.

An example set of documents 253 is illustrated. Documents 253 include documents 200A, 200B, and 200C, each including a "TITLE" and "YEAR" attribute. Documents 253 also include an "_ID" attribute, which may be a pre-assigned document identifier. In this example, the request (to the ISS) that caused the launch of the indexer instance 222 included parameters identifying the "_ID" attribute as the document identifier and to create bitmaps for sorting the TITLE and the YEAR attributes.

The indexer instance 222 can generate (or update) mapping data 251. In the illustrated example, with the indexing request identifying the _ID attribute as the document identifier, the mapping data 251 can include forward mapping data 255 to map from bit positions within a bitmap to the associated document identifier. In other examples, the indexer operation can assign document identifiers to each of the documents in the set of documents to be indexed. As shown, the document with _ID "Q" is assigned to bit position 0, "R" is assigned to bit position 1, and "S" is assigned to bit position 2. The mapping data 251 can also include reverse mapping data 252 to map from document identifiers to the assigned bit position within a bitmap.

The indexer instance 222 can generate (or update) sort bitmaps 250. The indexer instance 222 generates bitmaps based on the encoding of the attribute(s) being indexed for sorting. Example sources of the encoding format include as part of the original indexing request or in document metadata.

In sort bitmaps 250, the bitmaps are presented as rows of 1s and 0s. In this orientation, the number of columns in a row corresponds to the number of documents that have been indexed for sorting. The number of bitmaps (or rows) corresponds to the number of bits used to encode the value of the associated sortable attribute.

The number of sort bitmaps for a given attribute is approximately N×M where N is the number of documents and M is the number of bits used to encode the value of the attribute. Sort bitmaps can be compressed and bitmap operations can be performed using an algorithm such as Roaring Bitmaps (https://roaringbitmap.org/).

Indexing both the TITLE and YEAR attributes results in two sets of bitmaps: title bitmaps 280 and year bitmaps 290. For the TITLE attribute, assuming the length is limited to 2 characters and the characters are encoded in 8-bits (e.g., to fit 7-bit ASCII), the indexer instance 222 would generate the sixteen title bitmaps 280 as illustrated. For example, the binary ASCII encoding of A from most to least significant bit is 01000001 and B is 01000010. A bitmap slice 285 illustrates how the titles are encoded within bitmaps. Here, the TITLE value "BA" for document R, which corresponds to bit position 1 of the bitmap (using the forward mapping data) is reflected in character 0 bit positions 7-0 (01000010 for the binary B) through character 1 bit positions 7-0 (01000001 for the binary A) of bitmap slice 285. The other TITLE values "AA" and "AB" for documents Q and S can be seen in the other title bitmap slices.

For the YEAR attribute, assuming a simple unsigned 8-bit encoding from 0 (00000000) to 255 (11111111), the indexer instance 222 would generate eight bitmaps 290 as illustrated. As can be seen in the bitmap slices of the year bitmaps 290, the values 16, 23, and 11 for the respective documents Q, R, and S are present.

In some examples, the bitmap position within the bitmaps can be used as a secondary ordering index to ensure documents are not repeated and to allow spanning of documents with equivalent values across pages, if applicable. Thus, if ten documents have an equivalent string, they can be returned in an order based on their associated bitmap position within the mapping data.

The indexer instance 222 can store the generated or updated sort bitmaps 250 and mapping data 251 in an environment 107 associated with an environment identifier, such as in a database or a portion of a database provided by the NoSQL database service 105.

In the case of a NoSQL data backing, the bitmaps can be indexed based on a key. In the case of string data, an exemplary key can take the form of "attribute-character position-character encoding bit position" tuple, while in the case of numeric data an exemplary key can take the form of "attribute-number encoding bit position" tuple. In some examples, the environment identifier can be another parameter in the key tuple.

Figure 3:
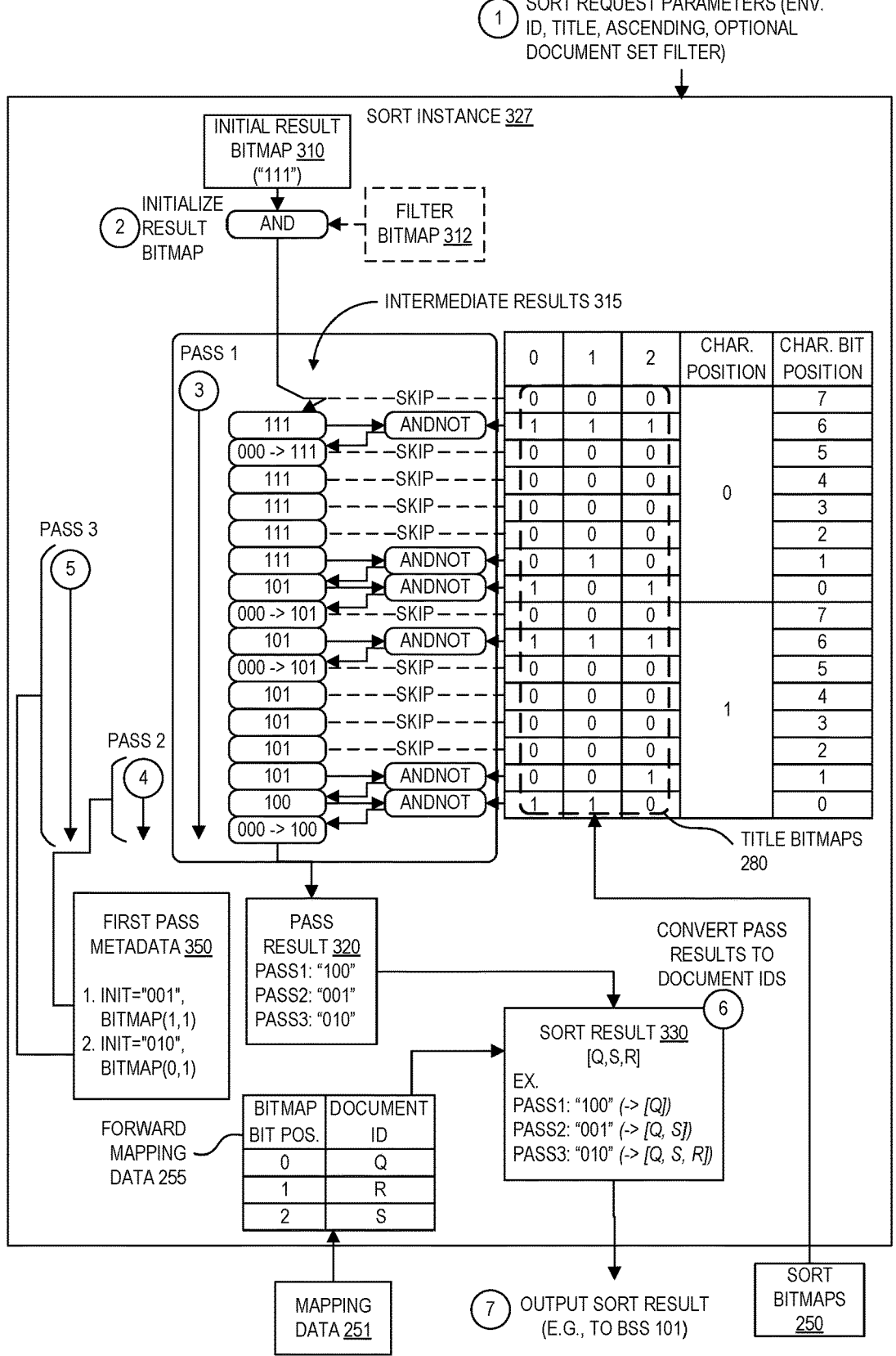
FIG. 3 is a diagram illustrating bitmap-based document sorting in ascending order according to some examples.

FIG. 3 is a diagram illustrating bitmap-based document sorting in ascending order according to some examples. In the illustrated approach, bitmap-based document sorting includes performing a series of passes through the bitmaps in an order based on the encoding of the sortable attribute. Here, an exemplary sorting flow of the TITLE attribute in ascending order is described with reference to circles 1-7.

In an example using the OCES 103, a sort function is executed by a sort instance 327 to sort documents. At circle 1, the sort instance 327 receives the sort request parameters, such as in environment variables provided by the BSS 101 as part of the sort instance 327 launch. In this example, the sort request is to sort the documents indexed in the example of FIG. 2 by the TITLE attribute in ascending order. The sort instance 327 can load the title bitmaps 280 from the sort bitmaps 250 and the forward mapping data 255 from the mapping data 251.

At circle 2, the sort instance 327 initializes a result bitmap. In this example, the result bitmap includes a '1' or set bit for each bit position in the sort bitmaps, the presence of which indicates that the document is the next document in the sorted order (in the case of ascending, the next smallest value). An initial result bitmap 310 is set as all 1s (here, 111) given there are three documents in the environment. Optionally, the sort instance 327 can apply a filter to mask any documents that should be omitted from the sorted order. For example, the sort instance 327 can perform a bitwise AND operation between a filter bitmap 312 and the initial result bitmap 310.

The filter bitmap 312 can be based on the optional document set filter provided to the sort instance 327. The document set filter may be a set of search results (e.g., documents that were identified in a search query). In some examples, the document set filter can be provided as a bitmap with 0s to eliminate documents that are not included in the result. In other examples, the document set filter can be provided as a set of document identifiers from which the sort instance 327 can build a bitmap using reverse mapping data (not shown).

At circle 3, the sort instance 327 performs bitwise operations through an ordered set of the bitmaps (referred to as a pass). Each pass identifies the next document to include in a sorted result. In the case of this ascending example, the first pass is to identify the document(s) with the smallest value, the second pass to identify the document(s) with the next smallest value, and so on. Within a pass, each bitwise operation with a given bitmap generates an intermediate result that can be used in the bitwise operation with the next bitmap in the ordered set. In the case of ascending sort order, the operations remove larger valued documents.

The ordering of the bitmaps is based on the encoding of the data in the sortable attribute, typically from most to least significant bit. For unsigned numeric data types, the bitmap ordering can be from most significant to least significant bit, for example. Signed data types can be adjusted, such as from two's complement into offset binary, to provide an ordering of the bitmaps from most to least significant bit, as will be appreciated by a person of skill in the art. For single characters, ordering can be from the most to the least significant bit of the encoding, for example. For strings (e.g., arrays of characters), the outer ordering of bitmaps can be the position of the character and the inner ordering can be the most to least significant bit of the character encoding as shown, for example.

In this example with the TITLE bitmaps correspond to a string data type encoded as described above, the outer ordering of bitmaps is the position of the character (from first to last) and the inner ordering is binary encoding of the character (from the most to least significant bit).

Intermediate results 315 of operations are illustrated in sequence from top to bottom. For the bitmap associated with character position 0 bit position 7, the sort instance 327 can determine to skip the bitmap. Such an optimization is optional and can be performed where a given bitmap would not change the previous intermediate result. Such is the case here where the bitmap is all 0s. The sort instance can detect the no-change condition by OR reducing across the bitmap to check whether any of the bits are set. The intermediate result 315 after the bitmap associated with character position 0 bit position 7 would remain unchanged from the initial result bitmap 310 as 111.

For the bitmap associated with character position 0 bit position 6, the sort instance 327 can perform a bitwise AND NOT operation between the previous intermediate result (111) and the bitmap (111). In this ascending example, the bitwise AND NOT operation removes documents having larger values (e.g., by negating the bitmap with a NOT, the AND performs a subtraction). The sort instance 327 can determine to revert the result to the previous intermediate result when the result of the operation would yield an empty set (here, 111 AND NOT 111→000), so the intermediate result after the bitmap associated with character position 0 bit position 6 would remain at 111.

The sort instance 327 can skip the next four bitmaps (character 0, bit positions 5 through 2) as each would result in no change to the intermediate result.

For the bitmap associated with character position 0 bit position 1, the sort instance 327 perform a bitwise AND NOT operation between the previous intermediate result (111) and the bitmap (010) resulting in an intermediate result of 101. In doing so, the sort instance 327 has eliminated the document associated with bitmap position 1 (document R, title "BA") from being considered the next smallest document.

For the bitmap associated with character position 0 bit position 0, the sort instance 327 can perform a bitwise AND NOT operation between the previous intermediate result (101) and the bitmap (101). Again, the sort instance 327 can determine to revert the result to the previous intermediate result as the result of the operation would yield an empty set (here, 101 AND NOT 101→000), so the intermediate result after the bitmap associated with character position 0 bit position 0 would remain at 101.

Having completed operations with the bitmaps for character position 0, the sort instance 327 can continue the pass for the bitmaps in the character position 1.

For the bitmap associated with character position 1 bit position 7, the sort instance 327 can determine to skip the bitmap as the result would not change.

For the bitmap associated with character position 1 bit position 6, the sort instance 327 can perform a bitwise AND NOT operation between the previous intermediate result (101) and the bitmap (111). Again, the sort instance 327 can determine to revert the result to the previous intermediate result as the result of the operation would yield an empty set (here, 101 AND NOT 111→000), so the intermediate result after the bitmap associated with character position 1 bit position 6 would remain at 101.

The sort instance 327 can skip the next four bitmaps (character 1, bit positions 5 through 2) as each would result in no change to the intermediate result.

For the bitmap associated with character position 1 bit position 1, the sort instance 327 perform a bitwise AND NOT operation between the previous intermediate result (101) and the bitmap (001) resulting in an intermediate result of 100. In doing so, the sort instance 327 has eliminated the document associated with bitmap position 2 (document S, title "AB") from being considered the next smallest document.

For the bitmap associated with character position 1 bit position 0, the sort instance 327 can perform a bitwise AND NOT operation between the previous intermediate result (100) and the bitmap (110). Again, the sort instance 327 can determine to revert the result to the previous intermediate result as the result of the operation would yield an empty set (here, 100 AND NOT 110→000), so the intermediate result after the bitmap associated with character position 1 bit position 0 would remain at 100.

Having completed a pass through the title bitmaps 280, the final intermediate result reflects the pass sort result 320 (pass 1: 100). Thus, for the first pass, the result of 100 includes a set bit in bitmap bit position 0 which corresponds to document Q.

In some examples, the sort instance 327 can skip certain bitmaps in passes subsequent to the first pass by recording metadata 350 associated with document eliminations during the first pass. In particular, the sort instance 327 can store, for some number of previous eliminations, a value to initialize an intermediate result to and an identification of the bitmap that resulted in the elimination. The number of eliminations can be limited by page size and written into a circular buffer. Thus, if the page size is N, the metadata can include information about the previous N−1 eliminations. When the minimum value is reached, the sort instance 327 can find at least the remaining N−1 document(s) to complete a page.

Here, during the first pass, the sort instance 327 recorded as metadata 350 the last elimination as occurring on character 1 bitmap 1 (as indicated by bitmap (1,1)) and that the initialization value should be 001. The initialization value is based on the previous intermediate value at that stage (101) minus the documents in the result of the prior passes. In this case, the initialization value would be 101 AND NOT 100 (the first pass result)→001.

The sort instance 327 also recorded as metadata 350 the second to last elimination as occurring on character 0 bitmap 1 (as indicated by bitmap (0,1)) and that the initialization value should be 010. The initialization value is based on the previous intermediate value at that stage (111) minus the documents in the result of the prior passes. In this case, the initialization value would be 101 AND NOT (100 (the first pass result) OR 001 (the second pass result))→001.

As indicated at circle 4, the sort instance 327 can perform the second pass to find the document(s) with the next lowest value with an initialized intermediate value of 001 and with the bitmap for character 1 bitmap 1. Although not shown, the second pass would yield a final intermediate result of 001 reflecting the pass sort result 320 (pass 2: 001). Thus, for the second pass, the result of 001 includes a set bit in bitmap bit position 2 which corresponds to document S.

As indicated at circle 5, the sort instance 327 can perform the third pass to find the document(s) with the next lowest value with an initialized intermediate value of 010 and with the bitmap for character 0 bitmap 1. Although not shown, the third pass would yield a final intermediate result of 010 reflecting the pass sort result 320 (pass 3: 010). Thus, for the third pass, the result of 010 includes a set bit in bitmap bit position 1 which corresponds to document R.

In other examples, the sort instance 327 can perform full passes through all of the bitmaps for each pass.

In some examples, the sort instance 327 can skip bitmaps toward the end of the ordered set of bitmaps by determining whether the current intermediate result includes a single document. The sort instance 327 can make such a determination by, for example, XOR reducing across the intermediate result to check whether a single bit is set. If so, that intermediate result can be treated as the final result for the pass (as no other eliminations can occur).

As indicated at circle 6, the sort instance 327 can convert the pass results 320 into their corresponding document identifiers in a sort result 330 using the forward mapping data 255. Here, the sort instance 327 can convert the results 320 into an ordered sort result 330 that identifies the documents in ascending order Q, S, R based on their respective titles AA, AB, BA as determined using the title bitmaps 280. At circle 7, the sort instance 327 can output the sort result 330 such as by sending it to the BSS 101. In some examples, the sort instance 327 can further include the values associated with the sort results in the sort result 330.

In paging examples, the sort instance 327 can perform passes until the number of documents per page is reached. Note that since multiple documents may have shared values for a given pass, the number of passes to populate a page can be less than the number of results per page. If the sort instance 327 terminates and another sort instance generates the results for the next page, the BSS 101 can buffer the sort result 330 and provide the document identifier of the last document of the previous page to the next sort instance.

Figure 4:
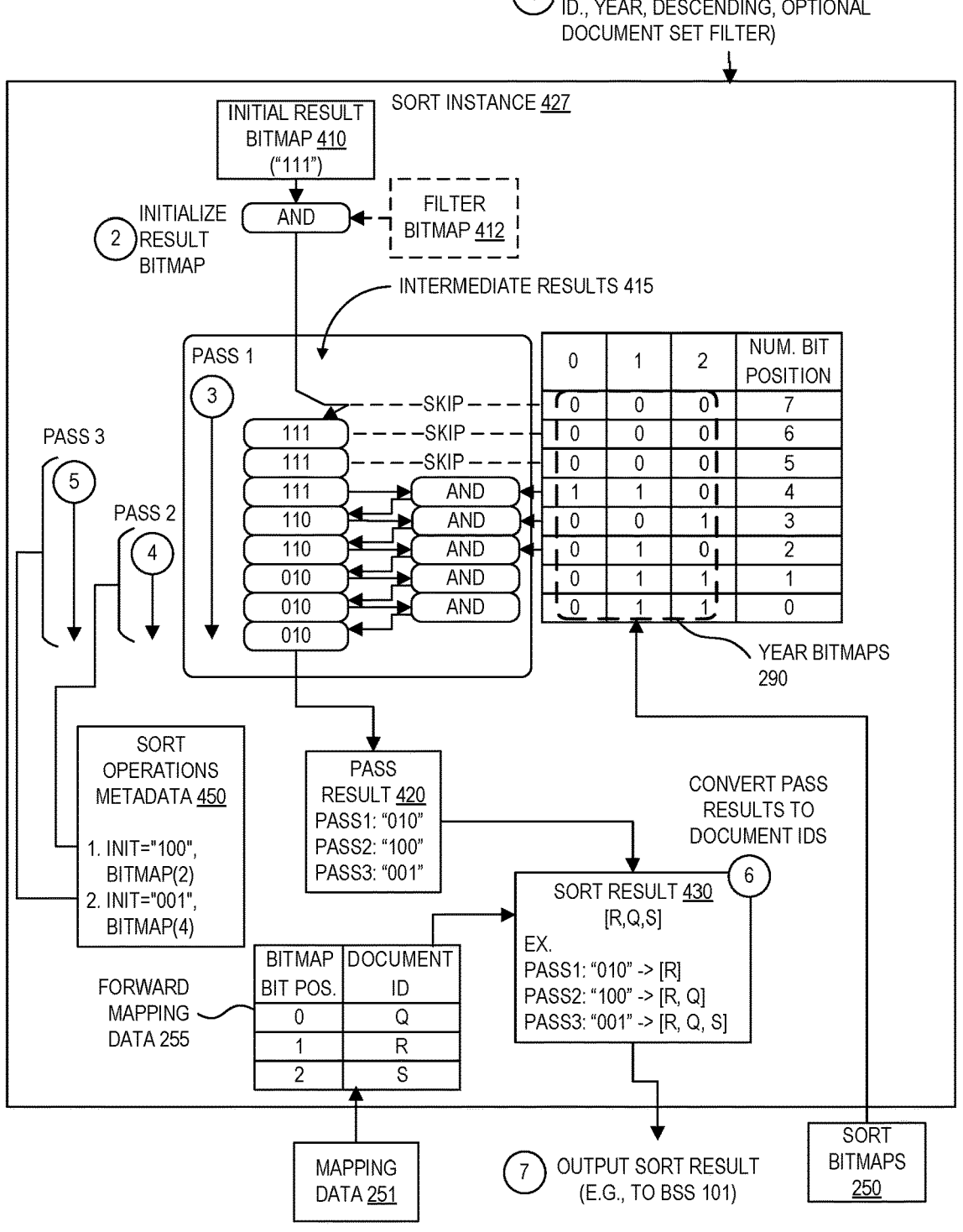
FIG. 4 is a diagram illustrating bitmap-based based document sorting in descending order according to some examples.

FIG. 4 is a diagram illustrating bitmap-based based document sorting in descending order according to some examples. In particular, an exemplary sorting flow of the YEAR attribute in descending order is described with reference to circles 1-7.

In an example using the OCES 103, a sort function is executed by a sort instance 427 to sort documents. At circle 1, the sort instance 427 receives the sort request parameters, such as in environment variables provided by the BSS 101 as part of the sort instance 427 launch. In this example, the sort request is to sort the documents indexed in the example of FIG. 2 by the YEAR attribute in descending order. The sort instance 427 can load the year bitmaps 290 from the sort bitmaps 250 and the forward mapping data 255 from the mapping data 251.

At circle 2, the sort instance 427 initializes a result bitmap. In this example, the result bitmap includes a '1' or set bit for each bit position in the sort bitmaps, the presence of which indicates that the document is the next document in the sorted order (in the case of descending, the next largest value). An initial result bitmap 410 is set as all 1s (here, 111) given there are three documents in the environment. Again, the sort instance 427 can optionally apply a filter to mask any documents that should be omitted from the sorted order. For example, the sort instance 427 can perform a bitwise AND operation between a filter bitmap 412, such as described above for filter bitmap 412, and the initial result bitmap 410.

At circle 3, the sort instance 427 performs a pass through an ordered set of bitmaps. In this descending example, the first pass is to identify the document(s) with the largest value, the second pass to identify the document(s) with the next largest value, and so on. Again, within a pass, each bitwise operation with a given bitmap generates an intermediate result that can be used in the bitwise operation with the next bitmap in the ordered set. In the case of descending sort order, the operations keep larger valued documents. Here, where the YEAR bitmaps correspond to a numeric data type encoded as described above, the set of bitmaps is ordered from most to least significant bit.

Intermediate results 415 of operations are illustrated in sequence from top to bottom. For the bitmaps associated with bit positions 7 through 5, the sort instance 427 can determine to skip the bitmap. Again, such an optimization is optional and can be performed where a given bitmap would not change the previous intermediate result. The intermediate result 415 after the bitmap associated with bit positions 7 through 5 would remain unchanged from the initial result bitmap 410 as 111.

For the bitmap associated with bit position 4, the sort instance 427 can perform a bitwise AND operation between the previous intermediate result (111) and the bitmap (110) resulting in an intermediate result of 110. In doing so, the sort instance 427 has eliminated the document associated with bitmap position 2 (document S, year "11") from being considered the next largest document.

The sort instance 427 can continue to perform bitwise operations through the remainder of the ordered set of YEAR bitmaps 290 (bit positions 3 through 0) as indicated. Having completed a pass through the year bitmaps 290, the final intermediate result reflects the pass sort result 420 (pass 1: 010). Thus, for the first pass, the result of 010 includes a set bit in bitmap bit position 1 which corresponds to document R.

As in the ascending example above, the sort instance 427 can skip certain bitmaps in passes subsequent to the first pass by recording metadata 450 associated with document eliminations during the first pass. Here, during the first pass, the sort instance 427 recorded as metadata 450 the last elimination as occurring with the bit position 2 bitmap (as indicated by bitmap (2)) and that the initialization value should be 100. The initialization value is based on the previous intermediate value at that stage (110) minus the documents in the result of the prior passes. In this case, the initialization value would be 110 AND NOT 010 (the first pass result)→100.

The sort instance 427 also recorded as metadata 450 the second to last elimination as occurring with the bit position 4 bitmap (as indicated by bitmap (4)) and that the initialization value should be 001. The initialization value is based on the previous intermediate value at that stage (111) minus the documents in the result of the prior passes. In this case, the initialization value would be 111 AND NOT (010 (the first pass result) OR 100 (the second pass result))→001.

As indicated at circle 4, the sort instance 427 can perform the second pass to find the document(s) with the next highest value with an initialized intermediate value of 100 and with the bitmap for bit position 2. Although not shown, the second pass would yield a final intermediate result of 100 reflecting the pass sort result 420 (pass 2: 100). Thus, for the second pass, the result of 100 includes a set bit in bitmap bit position 0 which corresponds to document Q.

As indicated at circle 5, the sort instance 427 can perform the third pass to find the document(s) with the next highest value with an initialized intermediate value of 001 and with the bitmap for bit position 4. Although not shown, the third pass would yield a final intermediate result of 001 reflecting the pass sort result 420 (pass 3: 001). Thus, for the third pass, the result of 001 includes a set bit in bitmap bit position 2 which corresponds to document S.

In other examples, the sort instance 427 can perform full passes through all of the bitmaps for each pass.

As in the ascending example above, the sort instance 427 can skip bitmaps toward the end of the ordered set of bitmaps by determining whether the current intermediate result includes a single document. The sort instance 427 can make such a determination by, for example, XOR reducing across the intermediate result to check whether a single bit is set. If so, that intermediate result can be treated as the final result for the pass (as no other eliminations can occur).

As indicated at circle 6, the sort instance 427 can convert the pass results 420 into their corresponding document identifiers in a sort result 430 using the forward mapping data 255. Here, the sort instance 427 can convert the results 420 into an ordered sort result 430 that identifies the documents in descending order R, Q, S based on their respective years 23, 16, 11 as determined using the year bitmaps 290. At circle 7, the sort instance 427 can output the sort result 430 such as by sending it to the BSS 101. In some examples, the sort instance 427 can further include the values associated with the sort results in the sort result 430.

As in the ascending example, when paging is implemented, the sort instance 427 can perform passes until the number of documents per page is reached.

Note that the ascending sort approach illustrated in FIG. 3 can be applied to other data types (e.g., the AND NOT operation to remove documents with higher values.) Likewise, the descending sort approach illustrated in FIG. 4 can be applied to other data types (e.g., the AND operation to keep documents with higher values).

Figure 5:
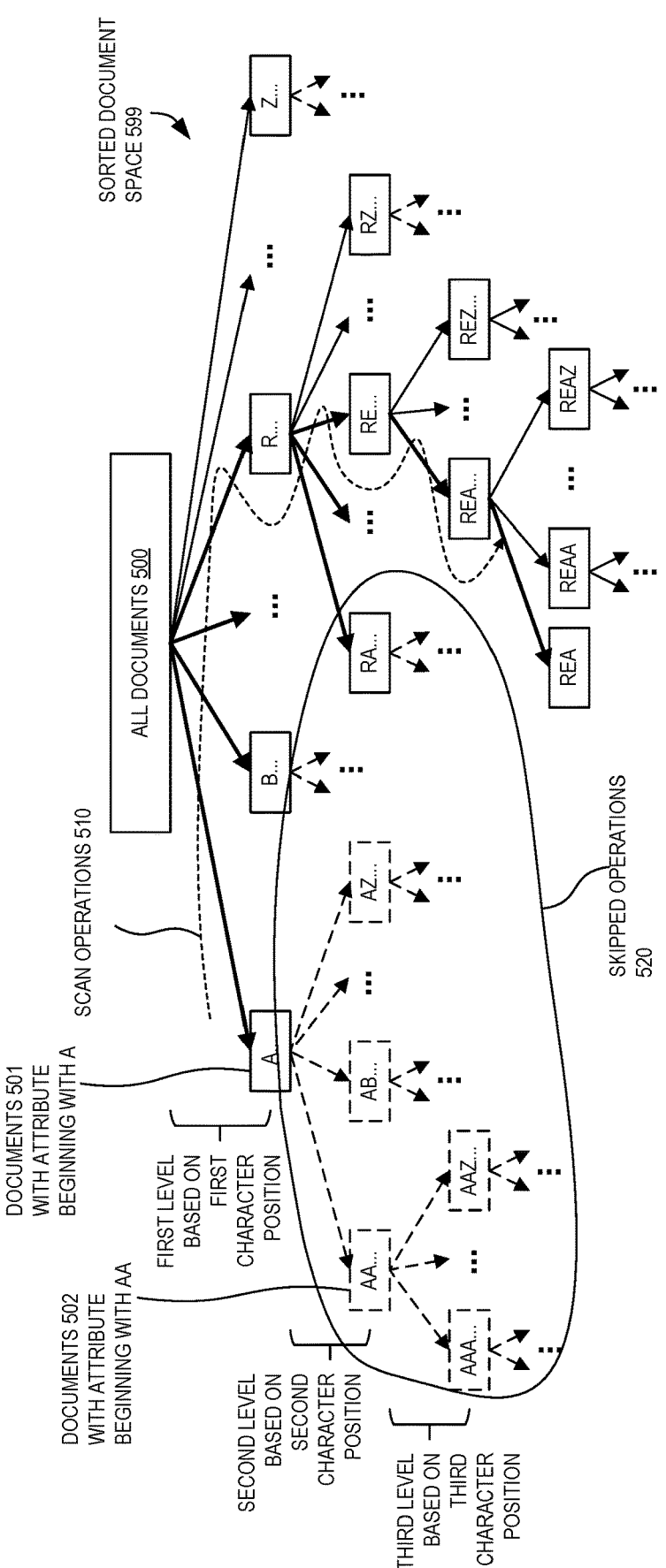
FIG. 5 is a diagram illustrating an approach to paging sort results according to some examples.

FIG. 5 is a diagram illustrating an approach to paging sort results according to some examples. In particular, the illustrated approach allows a sort instance to reduce the number of passes when identifying the next set of ordered documents for a page given the last result on the previous page. In this example, a set of documents have a sortable string attribute, the string attribute consisting of characters in the set (A . . . Z). The set of documents 500 can be conceptualized as a tree within a sorted document space 599, where the objective of a sorting algorithm is to locate documents 500 within the space 599.

In the illustrated example tree, the first level of the tree includes ordered sets of documents within the document set based on the first character position (e.g., documents 501), the second level includes ordered sets of documents within the first level document sets based on the next character position (e.g., documents 502), the third level includes ordered sets of documents within the second level document sets based on the third character position, and so on.

Using an identification of the last document on the previous page of sort results, a sort instance (not shown) can skip at least some of the operations associated with sorting previous results. Consider the last document on the previous page as having a particular bitmap position. The search instance can proceed through the first level until a result a set bit in the bitmap position of the last document, then through the next level, and so on, until the last document is found.

In the string formulation illustrated, consider the last document had a value "REA." The sort instance can perform scan operations 510 to locate the pass that yields the result REA. In particular, the sort instance can evaluate the first character position only until a result includes the last document—that is having a first position character value of R. Then the sort instance can evaluate the second character position only until a result includes the last document—that is having a second position character value of E. Then the sort instance can evaluate the third character position only until a result includes the last document—that is having a third position character value of A. The sort instance can then proceed as described above with reference to FIG. 3 or 4 to determine the next page of sorted documents. (In the case of bitmaps, a pass result including the last document identifier is based on the pass result having the associated document identifier bit position set). By searching for the last document before starting the sort operations, the search instance can skip passes associated with operations 520 (e.g., ordering the second character in documents that begin with A-Q, the third character within those sets, the fourth character, etc.).

FIG. 6 is a flow diagram illustrating operations 600 of a method for bitmap-based document sorting according to some examples. Some or all of the operations 600 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 600 are performed by the BSS 101 and/or a compute backing thereof of the other figures.

The operations 600 include, at block 602, receiving a request to sort a set of documents. For example, a sort request can be received by the BSS 101. Various parameters can be included with the request as described above. In some examples, the parameters can be relayed as environment variables to a sort instance to carry out the sort operations to fulfill the request.

The operations 600 further include, at block 604, obtaining a bitmap that identifies the set of documents to be sorted. For example, the bitmap can be obtained by generating a bitmap with all 1s such as the initial result bitmaps 310, 410. The bitmap can be optionally masked by a filter bitmap such as bitmaps 312, 412.

The operations 600 further include, at block 606, obtaining an ordered set of sort bitmaps, each sort bitmap in the ordered set of sort bitmaps corresponding to a bit in an encoding of a data type to be sorted. For example, the bitmaps can be obtained from a data store such as a database, the bitmaps previously generated by an indexer function. Exemplary sets of bitmaps include title bitmaps 280 and year bitmaps 290. The sort bitmaps can be associated with a particular sortable attribute in the set of documents. The ordering of the bitmaps can be based on the encoding of the data within the attribute (e.g., from most to least significant bit).

The operations 600 further include, at block 608, performing a series of passes of bitwise operations with the ordered set of sort bitmaps, each pass to identify a next document identifier to add to a sorted set of document identifiers by processing an initial bitmap with bitwise operations in order against at least a portion of the ordered set of sort bitmaps, and wherein the initial bitmap of the first pass in the series of passes is initialized with the obtained bitmap. As illustrated in FIGS. 3 and 4, a sort instance can perform passes of bitwise operations with the bitmaps to identify a result with bitmap positions corresponding to document identifiers.

The operations 600 further include, at block 610, storing the sorted set of document identifiers. The sort instance can store the result in a memory. In examples using the OCES 103, the sort instance can also send the result to the BSS 101 for storage and transmittal to a sort requestor.

Figure 7:
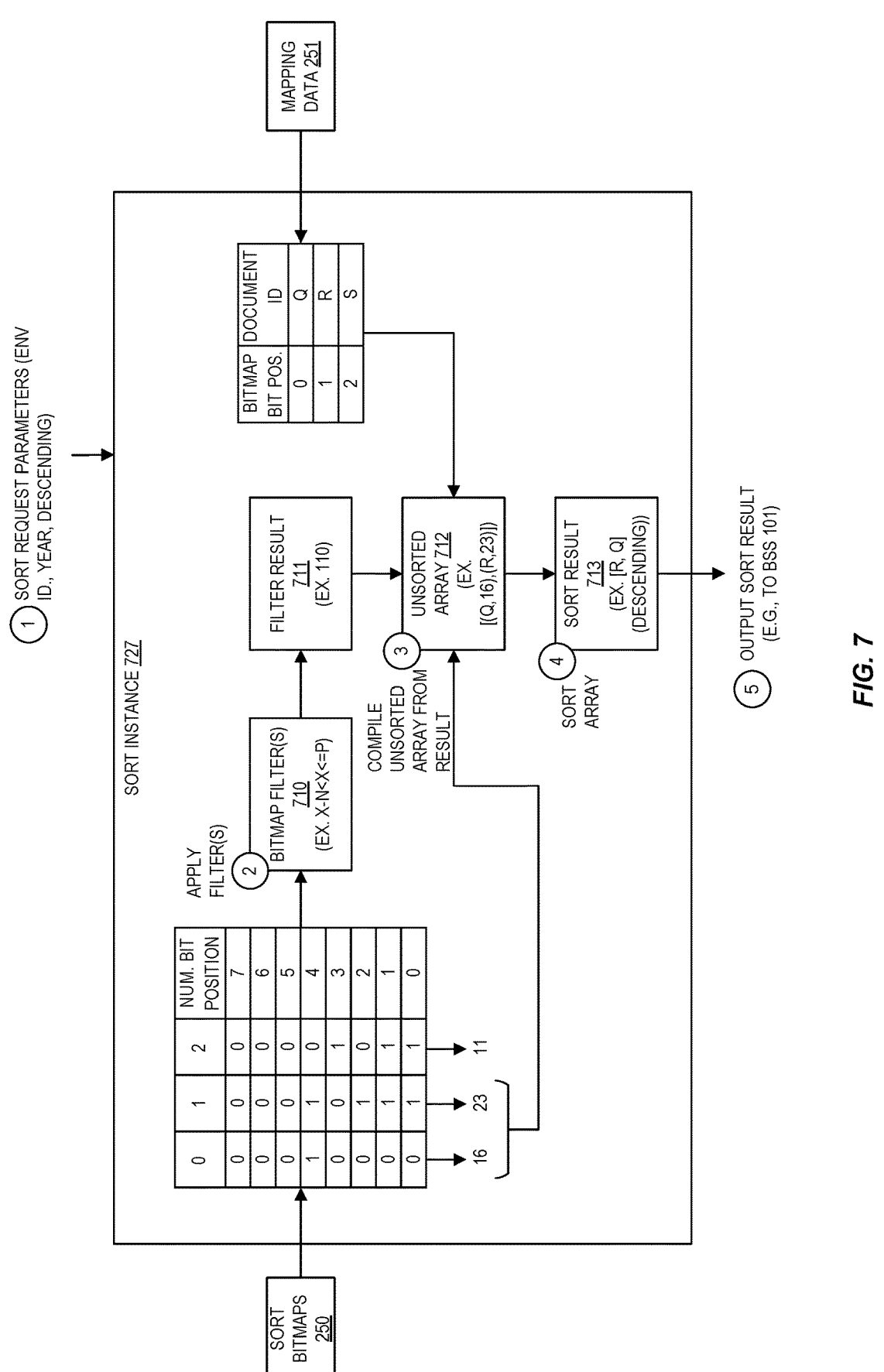
FIG. 7 is a diagram illustrating bitmap-based document sorting with numeric data according to some examples.

FIG. 7 is a diagram illustrating another approach to bitmap-based document sorting of numeric data according to some examples. In particular, this approach for ascending and descending sorts with bitmaps involves reducing the size of the sort problem by filtering the document space with the bitmaps into a smaller set of documents for sorting. Such an approach can be used for sorting numeric data into paged results. Here, an exemplary sorting flow of the YEAR attribute in descending order is described with reference to circles 1-5.

In an example using the OCES 103, a sort function is executed by a sort instance 727 to sort documents. At circle 1, the sort instance 727 receives the sort request parameters, such as in environment variables provided by the BSS 101 as part of the sort instance 727 launch. In this example, the sort request is to sort the documents indexed in the example of FIG. 2 by the YEAR attribute in descending order. The sort instance 727 can load the year bitmaps 290 from the sort bitmaps 250 and the forward mapping data 255 from the mapping data 251.

At circle 2, the sort instance 727 applies one or more bitmap filters 710 to identify a bitmap identifying a subset of the document identifiers for sorting. The filters may be combinations of AND, OR, and NOT operations between bitmaps.

In ascending sort examples, the bitmap filters 710 can find documents having values greater than or equal to the value of the last document returned on the previous page. Additionally, the filter can limit the set of documents to documents having values less than or less than or equal to another value. The other value can be determined during runtime to ensure that the resulting subset of documents includes at least as many documents as the page size. The sort instance 127 can step through increasingly smaller filter values until the filter results in a subset of documents smaller than the page size and use the previous filter value.

In descending sort examples, the bitmap filters 710 can find documents having values less than or equal to the value of the last document returned on the previous page. Additionally, the filter can limit the set of documents to documents having values greater than or greater than or equal to another value. Again, the other value can be determined during runtime to ensure that the resulting subset of documents includes at least as many documents as the page size. The sort instance 127 can step through increasingly larger filter values until the filter results in a subset of documents smaller than the page size and use the previous filter value.

In the ascending or descending case, the size of the number of documents in the filter result can exclude documents matching the value of the last document returned on the previous page. Doing so can handle cases where multiple documents having the same value were previously returned on a page. For example, if the previous last document had a value of one hundred along with ten other documents, half of which were also returned on the previous page with page size twenty, a filter that limited the filter result to those ten documents and ten additional documents would result in an insufficient number of documents for the next page (half of the ten plus the additional ten).

Here, assuming a value P of the last document and with descending sort, the filters can find the set of documents having values less than or equal to P, and greater than or greater than or equal to X-N (where N provides a lower bound that still includes sufficient documents for a page). (Note the example bitmaps for bit positions 0 through 7 may be significantly larger in a paged example than what is illustrated, the bitmap positions 0-3 being a subset of the whole.)

In the illustrated example, the sort instance 727 applies the bitmap filters 710 to generate a filter result 711 of 011. The exemplary filter result identifies a subset of the document identifiers associated with bitmap positions 0 and 1 as passing the bitmap filter(s) 710.

At circle 3, the sort instance 727 compiles an unsorted array 712 of document identifiers and associated values based on the document identifiers associated with the bitmap positions in the filter result 711. Here, bitmap positions 0 and 1 correspond to documents Q and R, respectively. The values of the YEAR attribute for documents Q and R are 16 and 23, respectively. Note that the sort instance 727 can derive the values from the bitmap slices associated with the bitmap positions of the documents.

At circle 4, the sort instance 727 sorts the unsorted array 712 to generate a sort result 713. The sort instance can use traditional sort techniques, such as heap-sorting the array or others as will be appreciated by those of skill in the art. As shown, sorting the unsorted array by value in descending order, the sort result 713 includes in order documents Q and R.

At circle 5, the sort instance 727 can output the sort result 713 such as by sending it to the BSS 101. In some examples, the sort instance 727 may further include the values associated with the sort results in the sort result 713.

Note that the value of the last document on a previous page and the associated document identifier can be persisted within a sort instance handling pages or transferred across sort instances when they are terminated between sorting pages. In any case, the sort instance can use the value of the last document to configure the filters 710 for the next page. Additional, since multiple documents may have the same value, the sort instance can use the document identifier of the last result on the previous page to remove or exclude documents in the sorted result that were also included on the previous page. For example, if documents with bitmap positions 5, 13, and 32 had a value of X and the document with bitmap position 5 was the last result on the previous page, the filters 710 may again identify the documents with bitmap positions 5, 13 and 32 in the next filter result. Using the stored indication that the document at bitmap position 5 was the last result on the previous page, sort instance can remove that document from the sort result (e.g., whether by masking it out of the filter result 711, removing it from the unsorted array 712, or popping it off the front of a sorted array that forms the sort result 713.)

FIG. 8 is a flow diagram illustrating operations 800 of another method for bitmap-based document sorting of numeric data according to some examples. Some or all of the operations 800 (or other processes described herein, or variations, and/or combinations thereof) are performed under the control of one or more computing devices configured with executable instructions, and are implemented as code (e.g., executable instructions, one or more computer programs, or one or more applications) executing collectively on one or more processors. The code is stored on a computer-readable storage medium, for example, in the form of a computer program comprising instructions executable by one or more processors. The computer-readable storage medium is non-transitory. In some examples, one or more (or all) of the operations 800 are performed by the BSS 101 and/or a compute backing thereof of the other figures.

The operations 800 include, at block 802, receiving a request to sort a set of documents by a numeric attribute. The operations 800 further include, at block 804, obtaining an ordered set of sort bitmaps, each sort bitmap in the ordered set of sort bitmaps corresponding to a bit in an encoding of the numeric attribute. The operations 800 further include, at block 806, filtering, using the ordered set of sort bitmaps, a set of document identifiers associated with the set of documents to identify a subset of document identifiers having a value of the numeric attribute within a range. The operations 800 further include, at block 808, sorting the subset of document identifiers into a sorted set of document identifiers, wherein a sort order of the sorted set of document identifiers is based on a value associated with the numeric attribute of each of the document identifiers.

Figure 9:
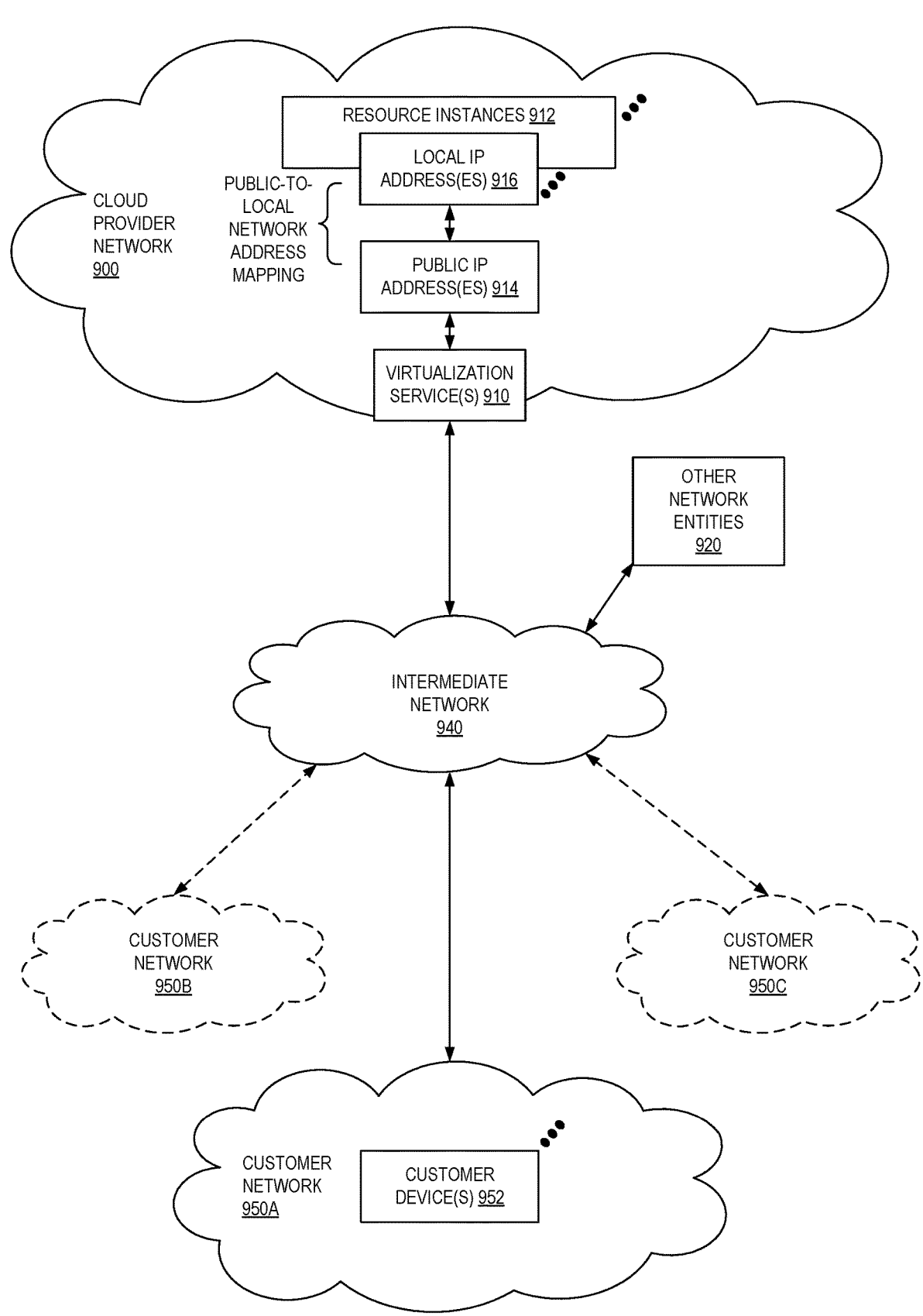
FIG. 9 illustrates an example cloud provider network environment according to some examples.

FIG. 9 illustrates an example provider network (or "service provider system") environment according to some examples. A provider network 900 can provide resource virtualization to customers via one or more virtualization services 910 that allow customers to purchase, rent, or otherwise obtain instances 912 of virtualized resources, including but not limited to computation and storage resources, implemented on devices within the provider network or networks in one or more data centers. Local Internet Protocol (IP) addresses 916 can be associated with the resource instances 912; the local IP addresses are the internal network addresses of the resource instances 912 on the provider network 900. In some examples, the provider network 900 can also provide public IP addresses 914 and/or public IP address ranges (e.g., Internet Protocol version 4 (IPv4) or Internet Protocol version 6 (IPv6) addresses) that customers can obtain from the provider 900.

Conventionally, the provider network 900, via the virtualization services 910, can allow a customer of the service provider (e.g., a customer that operates one or more customer networks 950A-950C (or "client networks") including one or more customer device(s) 952) to dynamically associate at least some public IP addresses 914 assigned or allocated to the customer with particular resource instances 912 assigned to the customer. The provider network 900 can also allow the customer to remap a public IP address 914, previously mapped to one virtualized computing resource instance 912 allocated to the customer, to another virtualized computing resource instance 912 that is also allocated to the customer. Using the virtualized computing resource instances 912 and public IP addresses 914 provided by the service provider, a customer of the service provider such as the operator of the customer network(s) 950A-950C can, for example, implement customer-specific applications and present the customer's applications on an intermediate network 940, such as the Internet. Other network entities 920 on the intermediate network 940 can then generate traffic to a destination public IP address 914 published by the customer network(s) 950A-950C; the traffic is routed to the service provider data center, and at the data center is routed, via a network substrate, to the local IP address 916 of the virtualized computing resource instance 912 currently mapped to the destination public IP address 914. Similarly, response traffic from the virtualized computing resource instance 912 can be routed via the network substrate back onto the intermediate network 940 to the source entity 920.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and can be mutable within the provider network. Network traffic originating outside the provider network is not directly routed to local IP addresses; instead, the traffic uses public IP addresses that are mapped to the local IP addresses of the resource instances. The provider network can include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses can be assigned by the provider network infrastructure to particular resource instances; these public IP addresses can be referred to as standard public IP addresses, or simply standard IP addresses. In some examples, the mapping of a standard IP address to a local IP address of a resource instance is the default launch configuration for all resource instance types.

At least some public IP addresses can be allocated to or obtained by customers of the provider network 900; a customer can then assign their allocated public IP addresses to particular resource instances allocated to the customer. These public IP addresses can be referred to as customer public IP addresses, or simply customer IP addresses. Instead of being assigned by the provider network 900 to resource instances as in the case of standard IP addresses, customer IP addresses can be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 10:
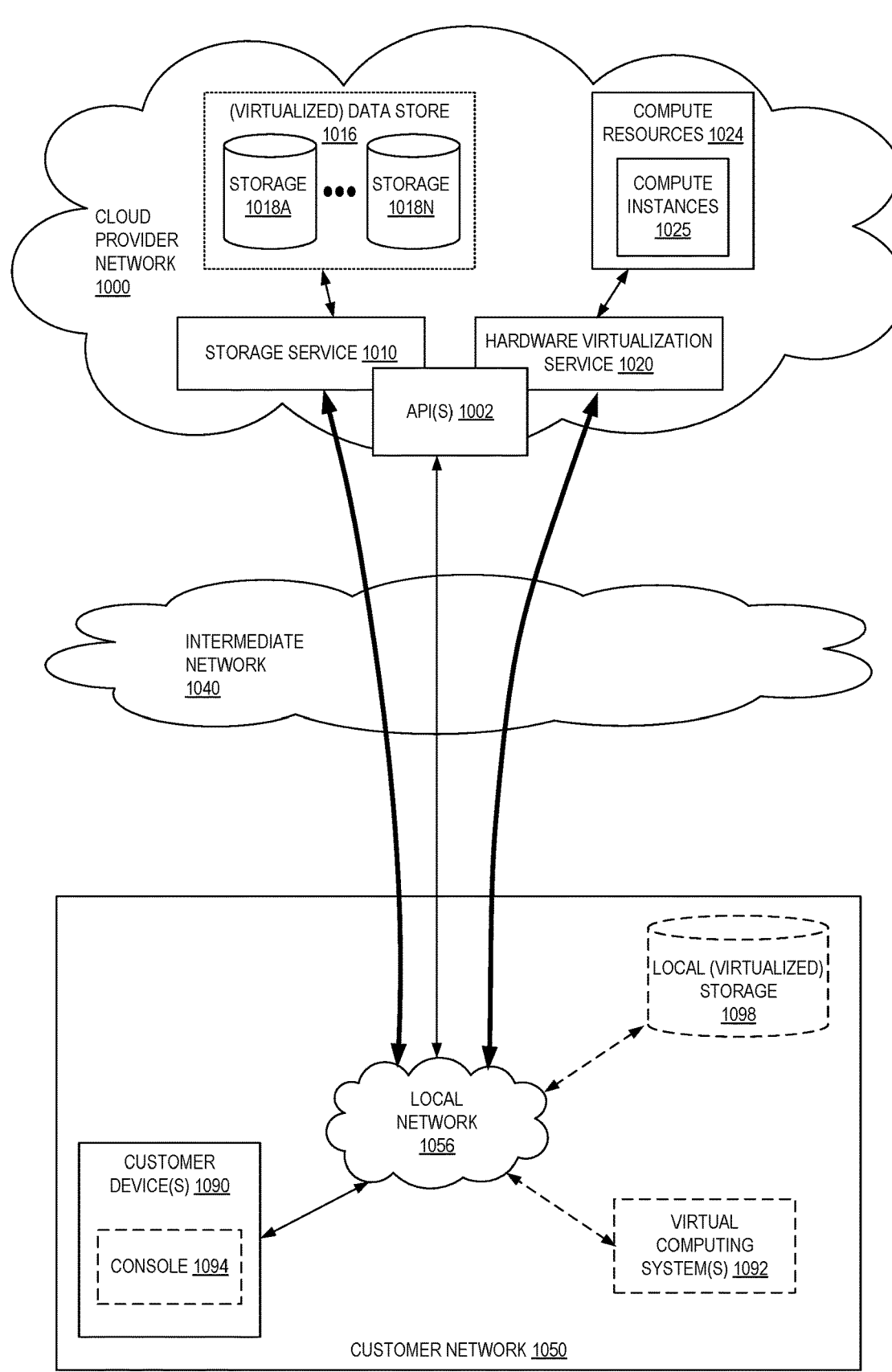
FIG. 10 is a block diagram of an example cloud provider network that provides a storage service and a hardware virtualization service to customers according to some examples.

FIG. 10 is a block diagram of an example provider network environment that provides a storage service and a hardware virtualization service to customers, according to some examples. A hardware virtualization service 1020 provides multiple compute resources 1024 (e.g., compute instances 1025, such as VMs) to customers. The compute resources 1024 can, for example, be provided as a service to customers of a provider network 1000 (e.g., to a customer that implements a customer network 1050). Each computation resource 1024 can be provided with one or more local IP addresses. The provider network 1000 can be configured to route packets from the local IP addresses of the compute resources 1024 to public Internet destinations, and from public Internet sources to the local IP addresses of the compute resources 1024.

The provider network 1000 can provide the customer network 1050, for example coupled to an intermediate network 1040 via a local network 1056, the ability to implement virtual computing systems 1092 via the hardware virtualization service 1020 coupled to the intermediate network 1040 and to the provider network 1000. In some examples, the hardware virtualization service 1020 can provide one or more APIs 1002, for example a web services interface, via which the customer network 1050 can access functionality provided by the hardware virtualization service 1020, for example via a console 1094 (e.g., a web-based application, standalone application, mobile application, etc.) of a customer device 1090. In some examples, at the provider network 1000, each virtual computing system 1092 at the customer network 1050 can correspond to a computation resource 1024 that is leased, rented, or otherwise provided to the customer network 1050.

From an instance of the virtual computing system(s) 1092 and/or another customer device 1090 (e.g., via console 1094), the customer can access the functionality of a storage service 1010, for example via the one or more APIs 1002, to access data from and store data to storage resources 1018A-1018N of a virtual data store 1016 (e.g., a folder or "bucket," a virtualized volume, a database, etc.) provided by the provider network 1000. In some examples, a virtualized data store gateway (not shown) can be provided at the customer network 1050 that can locally cache at least some data, for example frequently accessed or critical data, and that can communicate with the storage service 1010 via one or more communications channels to upload new or modified data from a local cache so that the primary store of data (the virtualized data store 1016) is maintained. In some examples, a user, via the virtual computing system 1092 and/or another customer device 1090, can mount and access virtual data store 1016 volumes via the storage service 1010 acting as a storage virtualization service, and these volumes can appear to the user as local (virtualized) storage 1098.

While not shown in FIG. 10, the virtualization service(s) can also be accessed from resource instances within the provider network 1000 via the API(s) 1002. For example, a customer, appliance service provider, or other entity can access a virtualization service from within a respective virtual network on the provider network 1000 via the API(s) 1002 to request allocation of one or more resource instances within the virtual network or within another virtual network.

Illustrative Systems

Figure 11:
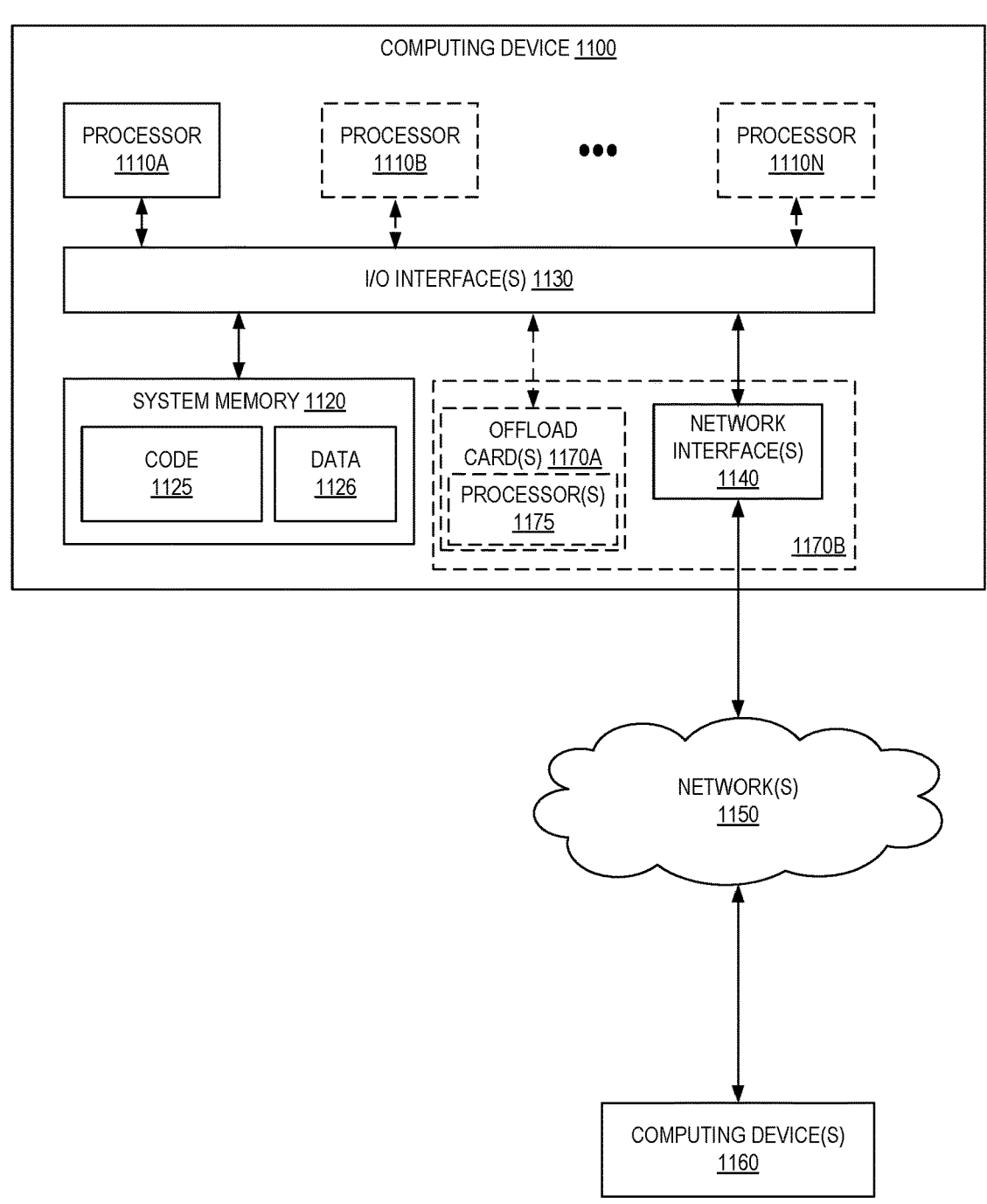
FIG. 11 is a block diagram illustrating an example computing device that can be used in some examples.

In some examples, a system that implements a portion or all of the techniques described herein can include a general-purpose computer system, such as the computing device 1100 (also referred to as a computing system or electronic device) illustrated in FIG. 11, that includes, or is configured to access, one or more computer-accessible media. In the illustrated example, the computing device 1100 includes one or more processors 1110 coupled to a system memory 1120 via an input/output (I/O) interface 1130. The computing device 1100 further includes a network interface 1140 coupled to the I/O interface 1130. While FIG. 11 shows the computing device 1100 as a single computing device, in various examples the computing device 1100 can include one computing device or any number of computing devices configured to work together as a single computing device 1100.

In various examples, the computing device 1100 can be a uniprocessor system including one processor 1110, or a multiprocessor system including several processors 1110 (e.g., two, four, eight, or another suitable number). The processor(s) 1110 can be any suitable processor(s) capable of executing instructions. For example, in various examples, the processor(s) 1110 can be general-purpose or embedded processors implementing any of a variety of instruction set architectures (ISAs), such as the x86, ARM, PowerPC, SPARC, or MIPS ISAs, or any other suitable ISA. In multiprocessor systems, each of the processors 1110 can commonly, but not necessarily, implement the same ISA.

The system memory 1120 can store instructions and data accessible by the processor(s) 1110. In various examples, the system memory 1120 can be implemented using any suitable memory technology, such as random-access memory (RAM), static RAM (SRAM), synchronous dynamic RAM (SDRAM), nonvolatile/Flash-type memory, or any other type of memory. In the illustrated example, program instructions and data implementing one or more desired functions, such as those methods, techniques, and data described above, are shown stored within the system memory 1120 as code 1125 (e.g., executable to implement, in whole or in part, the indexer function 120, sort function 125, and/or document services 101) and data 1126.

In some examples, the I/O interface 1130 can be configured to coordinate I/O traffic between the processor 1110, the system memory 1120, and any peripheral devices in the device, including the network interface 1140 and/or other peripheral interfaces (not shown). In some examples, the I/O interface 1130 can perform any necessary protocol, timing, or other data transformations to convert data signals from one component (e.g., the system memory 1120) into a format suitable for use by another component (e.g., the processor 1110). In some examples, the I/O interface 1130 can include support for devices attached through various types of peripheral buses, such as a variant of the Peripheral Component Interconnect (PCI) bus standard or the Universal Serial Bus (USB) standard, for example. In some examples, the function of the I/O interface 1130 can be split into two or more separate components, such as a north bridge and a south bridge, for example. Also, in some examples, some or all of the functionality of the I/O interface 1130, such as an interface to the system memory 1120, can be incorporated directly into the processor 1110.

The network interface 1140 can be configured to allow data to be exchanged between the computing device 1100 and other computing devices 1160 attached to a network or networks 1150, such as other computer systems or devices as illustrated in FIG. 1, for example. In various examples, the network interface 1140 can support communication via any suitable wired or wireless general data networks, such as types of Ethernet network, for example. Additionally, the network interface 1140 can support communication via telecommunications/telephony networks, such as analog voice networks or digital fiber communications networks, via storage area networks (SANs), such as Fibre Channel SANs, and/or via any other suitable type of network and/or protocol.

In some examples, the computing device 1100 includes one or more offload cards 1170A or 1170B (including one or more processors 1175, and possibly including the one or more network interfaces 1140) that are connected using the I/O interface 1130 (e.g., a bus implementing a version of the Peripheral Component Interconnect-Express (PCI-E) standard, or another interconnect such as a QuickPath interconnect (QPI) or UltraPath interconnect (UPI)). For example, in some examples the computing device 1100 can act as a host electronic device (e.g., operating as part of a hardware virtualization service) that hosts compute resources such as compute instances, and the one or more offload cards 1170A or 1170B execute a virtualization manager that can manage compute instances that execute on the host electronic device. As an example, in some examples the offload card(s) 1170A or 1170B can perform compute instance management operations, such as pausing and/or un-pausing compute instances, launching and/or terminating compute instances, performing memory transfer/copying operations, etc. These management operations can, in some examples, be performed by the offload card(s) 1170A or 1170B in coordination with a hypervisor (e.g., upon a request from a hypervisor) that is executed by the other processors 1110A-1110N of the computing device 1100. However, in some examples the virtualization manager implemented by the offload card(s) 1170A or 1170B can accommodate requests from other entities (e.g., from compute instances themselves), and cannot coordinate with (or service) any separate hypervisor.

In some examples, the system memory 1120 can be one example of a computer-accessible medium configured to store program instructions and data as described above. However, in other examples, program instructions and/or data can be received, sent, or stored upon different types of computer-accessible media. Generally speaking, a computer-accessible medium can include any non-transitory storage media or memory media such as magnetic or optical media, e.g., disk or DVD/CD coupled to the computing device 1100 via the I/O interface 1130. A non-transitory computer-accessible storage medium can also include any volatile or non-volatile media such as RAM (e.g., SDRAM, double data rate (DDR) SDRAM, SRAM, etc.), read only memory (ROM), etc., that can be included in some examples of the computing device 1100 as the system memory 1120 or another type of memory. Further, a computer-accessible medium can include transmission media or signals such as electrical, electromagnetic, or digital signals, conveyed via a communication medium such as a network and/or a wireless link, such as can be implemented via the network interface 1140.

Various examples discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most examples use at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In examples using a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also can be capable of executing programs or scripts in response requests from user devices, such as by executing one or more Web applications that can be implemented as one or more scripts or programs written in any programming language, such as Java®, C, C# or C++, or any scripting language, such as Perl, Python, PHP, or TCL, as well as combinations thereof. The server(s) can also include database servers, including without limitation those commercially available from Oracle®, Microsoft®, Sybase®, IBM®, etc. The database servers can be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of examples, the information can reside in a storage-area network (SAN) familiar to those skilled in the art. Similarly, any necessary files for performing the functions attributed to the computers, servers, or other network devices can be stored locally and/or remotely, as appropriate. Where a system includes computerized devices, each such device can include hardware elements that can be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system can also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate examples can have numerous variations from that described above. For example, customized hardware might also be used and/or particular elements might be implemented in hardware, software (including portable software, such as applets), or both. Further, connection to other computing devices such as network input/output devices can be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various examples.

In the preceding description, various examples are described. For purposes of explanation, specific configurations and details are set forth in order to provide a thorough understanding of the examples. However, it will also be apparent to one skilled in the art that the examples can be practiced without the specific details. Furthermore, well-known features can be omitted or simplified in order not to obscure the example being described.

Bracketed text and blocks with dashed borders (e.g., large dashes, small dashes, dot-dash, and dots) are used herein to illustrate optional aspects that add additional features to some examples. However, such notation should not be taken to mean that these are the only options or optional operations, and/or that blocks with solid borders are not optional in certain examples.

Reference numerals with suffix letters (e.g., 1018A-1018N) can be used to indicate that there can be one or multiple instances of the referenced entity in various examples, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters might or might not have the same number of instances in various examples.

References to "one example," "an example," etc., indicate that the example described may include a particular feature, structure, or characteristic, but every example may not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

Moreover, in the various examples described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given example requires at least one of A, at least one of B, and at least one of C to each be present.

As used herein, the term "based on" (or similar) is an open-ended term used to describe one or more factors that affect a determination or other action. It is to be understood that this term does not foreclose additional factors that may affect a determination or action. For example, a determination may be solely based on the factor(s) listed or based on the factor(s) and one or more additional factors. Thus, if an action A is "based on" B, it is to be understood that B is one factor that affects action A, but this does not foreclose the action from also being based on one or multiple other factors, such as factor C. However, in some instances, action A may be based entirely on B.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

Further, the words "may" or "can" are used in a permissive sense (i.e., meaning having the potential to), rather than the mandatory sense (i.e., meaning must). The words "include," "including," and "includes" are used to indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated. Similarly, the values of such numeric labels are generally not used to indicate a required amount of a particular noun in the claims recited herein, and thus a "fifth" element generally does not imply the existence of four other elements unless those elements are explicitly included in the claim or it is otherwise made abundantly clear that they exist.

The specification and drawings are, accordingly, to be regarded in an illustrative rather than a restrictive sense. It will, however, be evident that various modifications and changes can be made thereunto without departing from the broader scope of the disclosure as set forth in the claims.

What is claimed is:

1. A computer-implemented method comprising:
receiving a request to sort a set of documents;
obtaining a bitmap that identifies the set of documents to be sorted;
obtaining an ordered set of sort bitmaps, each sort bitmap in the ordered set of sort bitmaps corresponding to a bit in an encoding of a data type to be sorted;
obtaining an indication of a last document on a page of sort results;
performing an initial series of passes of bitwise operations with the ordered set of sort bitmaps to identify a pass that includes the last document as a result, wherein the initial series of passes skips operations associated with bitmaps of at least some character positions;
performing, at an end of the initial series of passes, a series of passes of bitwise operations with the ordered set of sort bitmaps, each pass to identify a next document identifier to add to a sorted set of document identifiers by processing an initial bitmap with bitwise operations in order against at least a portion of the ordered set of sort bitmaps, and wherein the initial bitmap of a first pass in the series of passes is initialized with the obtained bitmap; and
storing the sorted set of document identifiers.

2. The computer-implemented method of claim 1, wherein the data type is a string of characters, and wherein the ordered set of sort bitmaps is arranged first by character position from first character to last character and then, within each character position, from most significant bit to least significant bit of a binary character encoding of characters in the string of characters.

3. The computer-implemented method of claim 1, wherein the ordered set of sort bitmaps is arranged from most significant bit to least significant bit of a binary representation of an encoding of the data type.

4. The computer-implemented method of claim 1, wherein the request includes an indication to sort the set of documents in ascending order, and wherein the bitwise operations include operations to remove bits set in a negated sort bitmap from the initial bitmap.

5. The computer-implemented method of claim 1, further comprising:
determining that an OR reduction of a given sort bitmap in the ordered set of sort bitmaps indicates the given sort bitmap is empty; and
skipping the given sort bitmap in the passes.

6. The computer-implemented method of claim 1, wherein each bitwise operation within a pass generates an intermediate bitmap result, and further comprising, within a given pass:
storing an intermediate bitmap result that preceded a next intermediate bitmap result with a removed document identifier; and
storing an index of a sort bitmap used in a bitwise operation with the intermediate bitmap result.

7. The computer-implemented method of claim 6, further comprising, in a pass subsequent to the given pass, processing an initial bitmap with bitwise operations in order against a portion of the ordered set of sort bitmaps beginning with the sort bitmap indicated by the index, and wherein the initial bitmap in the subsequent pass is initialized based at least in part on the stored intermediate bitmap result.

8. The computer-implemented method of claim 1, wherein each pass in the series of passes generates a bitmap result, and further comprising:
obtaining mapping data that maps sort bitmap positions to document identifiers; and
identifying, using the mapping data, the next document identifier to add to a sorted set of document identifiers based on a lookup of a set bit position within the bitmap result.

9. The computer-implemented method of claim 1, wherein the request to sort the set of documents includes a filter bitmap that identifies the set of documents within a larger set of documents, and wherein obtaining the bitmap that identifies the set of documents to be sorted comprises filtering a bitmap identifying all documents in the larger set of documents with the filter bitmap.

10. The computer-implemented method of claim 9, wherein the larger set of documents are hosted with a document service of a cloud provider network.

11. The computer-implemented method of claim 1, further comprising:

receiving another request to sort the set of documents by a numeric attribute;

obtaining another ordered set of sort bitmaps, each sort bitmap in the another ordered set of sort bitmaps corresponding to a bit in an encoding of the numeric attribute;

filtering, using the another ordered set of sort bitmaps, a set of document identifiers associated with the set of documents to identify a subset of document identifiers having a value of the numeric attribute within a range; and sorting the subset of document identifiers into another sorted set of document identifiers, wherein a sort order of the another sorted set of document identifiers is based on a value associated with the numeric attribute of each of the document identifiers.

12. A system comprising:

a first one or more electronic devices to implement a data store in a provider network; and a second one or more electronic devices to implement a service in the provider network, the service including instructions that upon execution cause the service to:

receive a request to sort a set of documents;

obtain a bitmap that identifies the set of documents to be sorted;

obtain an ordered set of sort bitmaps, each sort bitmap in the ordered set of sort bitmaps corresponding to a bit in an encoding of a data type to be sorted;

obtain an indication of a last document on a page of sort results:

perform an initial series of passes of bitwise operations with the ordered set of sort bitmaps to identify a pass that includes the last document as a result, wherein the initial series of passes skips operations associated with bitmaps of at least some character positions;

perform, at an end of the initial series of passes, a series of passes of bitwise operations with the ordered set of sort bitmaps, each pass to identify a next document identifier to add to a sorted set of document identifiers by processing an initial bitmap with bitwise operations in order against at least a portion of the ordered set of sort bitmaps, and wherein the initial bitmap of a first pass in the series of passes is initialized with the obtained bitmap; and store the sorted set of document identifiers in the data store.

13. The system of claim 12, wherein the data type is a string of characters, and wherein the ordered set of sort bitmaps is arranged first by character position from first character to last character and then, within each character position, from most significant bit to least significant bit of a binary character encoding of characters in the string of characters.

14. The system of claim 12, wherein the ordered set of sort bitmaps is arranged from most significant bit to least significant bit of a binary representation of an encoding of the data type.

15. The system of claim 12, wherein the request includes an indication to sort the set of documents in ascending order, and wherein the bitwise operations include operations to remove bits set in a negated sort bitmap from the initial bitmap.

16. The system of claim 12, wherein the request to sort the set of documents includes a filter bitmap that identifies the set of documents within a larger set of documents, and wherein obtaining the bitmap that identifies the set of documents to be sorted comprises filtering a bitmap identifying all documents in the larger set of documents with the filter bitmap.

17. A computer-implemented method comprising:

receiving a request to sort a set of documents;

obtaining a bitmap that identifies the set of documents to be sorted;

obtaining an ordered set of sort bitmaps, each sort bitmap in the ordered set of sort bitmaps corresponding to a bit in an encoding of a data type to be sorted;

performing a series of passes of bitwise operations with the ordered set of sort bitmaps, each pass to identify a next document identifier to add to a sorted set of document identifiers by processing an initial bitmap with bitwise operations in order against at least a portion of the ordered set of sort bitmaps, and wherein the initial bitmap of a first pass in the series of passes is initialized with the obtained bitmap, wherein each bitwise operation within a pass generates an intermediate bitmap result, and further comprising, within a given pass:

storing an intermediate bitmap result that preceded a next intermediate bitmap result with a removed document identifier; and storing an index of a sort bitmap used in a bitwise operation with the intermediate bitmap result; and storing the sorted set of document identifiers.

18. The computer-implemented method of claim 17, further comprising, in a pass subsequent to the given pass, processing an initial bitmap with bitwise operations in order against a portion of the ordered set of sort bitmaps beginning with the sort bitmap indicated by the index, and wherein the initial bitmap in the subsequent pass is initialized based at least in part on the stored intermediate bitmap result.

19. The computer-implemented method of claim 17, wherein each pass in the series of passes generates a bitmap result, and further comprising:

obtaining mapping data that maps sort bitmap positions to document identifiers; and identifying, using the mapping data, the next document identifier to add to a sorted set of document identifiers based on a lookup of a set bit position within the bitmap result.

20. The computer-implemented method of claim 17, wherein the request includes an indication to sort the set of documents in ascending order, and wherein the bitwise operations include operations to remove bits set in a negated sort bitmap from the initial bitmap.

* * * * *